US009590717B2

(12) United States Patent
Kim

(10) Patent No.: US 9,590,717 B2
(45) Date of Patent: Mar. 7, 2017

(54) SIGNAL RECEIVING METHOD AND ELECTRONIC DEVICE

(71) Applicant: Samsung Electronics Co., Ltd., Gyeonggi-do (KR)

(72) Inventor: Young-Ju Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/520,949

(22) Filed: Oct. 22, 2014

(65) Prior Publication Data

US 2015/0110229 A1   Apr. 23, 2015

(30) Foreign Application Priority Data

Oct. 22, 2013   (KR) .................. 10-2013-0126213

(51) Int. Cl.
| | | |
|---|---|---|
| *H04L 27/00* | (2006.01) | |
| *H04B 7/08* | (2006.01) | |
| *H04L 25/03* | (2006.01) | |
| *H04B 1/00* | (2006.01) | |
| *H04L 1/06* | (2006.01) | |
| *H04B 1/12* | (2006.01) | |

(Continued)

(52) U.S. Cl.
CPC .............. *H04B 7/082* (2013.01); *H04B 1/006* (2013.01); *H04L 25/03821* (2013.01); *H04B 1/1027* (2013.01); *H04B 1/123* (2013.01); *H04B 3/32* (2013.01); *H04L 1/0618* (2013.01); *H04L 5/0007* (2013.01); *H04L 25/03057* (2013.01); *H04L 25/03343* (2013.01); *H04L 27/2647* (2013.01); *H04N 5/4401* (2013.01)

(58) Field of Classification Search
CPC .......... H04B 7/082; H04B 1/006; H04B 3/32; H04B 1/1027; H04B 1/123; H04L 25/03821; H04L 27/2647; H04L 25/03343; H04L 25/03057; H04L 5/0007; H04L 1/0618; H04L 1/06; H04N 5/4401

USPC ......................................... 375/260, 267, 375
See application file for complete search history.

(56) References Cited

U.S. PATENT DOCUMENTS

2004/0125899 A1\* 7/2004 Li ...................... H04B 7/0857
  375/347
2005/0239417 A1\* 10/2005 Boos ...................... H04B 1/406
  455/86

(Continued)

FOREIGN PATENT DOCUMENTS

GB           2472978           3/2011

OTHER PUBLICATIONS

European Search Report dated Mar. 16, 2015 issued in counterpart application No. 14189325.5-1852.

*Primary Examiner* — Janice Tieu
(74) *Attorney, Agent, or Firm* — The Farrell Law Firm, P.C.

(57) ABSTRACT

An electronic device including a first transceiver configured to process a first carrier, a second transceiver configured to process a second carrier, a switch, a baseband processor configured to process a first baseband signal and a second baseband signal, which are processed respectively by the first transceiver and the second transceiver, an antenna connected through the switch in association with some of a plurality of reception paths with respect to the first carrier, and a reception path configured to provide the second transceiver with the first carrier received via the antenna connected through the switch to the second transceiver.

14 Claims, 24 Drawing Sheets

(51) Int. Cl.
*H04L 5/00* (2006.01)
*H04L 27/26* (2006.01)
*H04B 3/32* (2006.01)
*H04B 1/10* (2006.01)
*H04N 5/44* (2011.01)

(56) References Cited

U.S. PATENT DOCUMENTS

| | | | |
|---|---|---|---|
| 2008/0227485 A1 | 9/2008 | Kim | |
| 2012/0294299 A1* | 11/2012 | Fernando | H04B 7/08 370/339 |
| 2013/0051284 A1* | 2/2013 | Khlat | H04L 5/00 370/277 |
| 2013/0230080 A1 | 9/2013 | Gudem et al. | |

* cited by examiner

SIGNAL RECEIVING METHOD AND ELECTRONIC DEVICE

PRIORITY

This application claims priority under 35 U.S.C. §119(a) to a Korean Patent Application filed on Oct. 22, 2013 in the Korean Intellectual Property Office and assigned Serial No. 10-2013-0126213, the entire content of which is incorporated herein by reference.

BACKGROUND

1. Field of the Invention

The present disclosure relates generally to a method and apparatus for diversity reception in an electronic device.

2. Description of the Related Art

Wireless communication techniques are widely used not only in various industrial fields but also in real life. For example, a portable terminal such as a smart phone, which has become a necessity of modern life, communicates wirelessly with a communication system of a vendor. Further, near field wireless communication is widely used, along with broadband wireless communication (e.g., a mobile phone).

To improve communication quality, wireless communication techniques have been developed in both hardware and software. For example, a communication technique using a plurality of antennas has been developed, and a technique for more effectively extracting data from a signal is under development. A diversity reception scheme is one example of a reception scheme that uses a plurality of antennas. In the diversity reception scheme, a signal is received through different paths to acquire a plurality of reception (RX) signals, and the RX signals are combined to increase the gain of the signal. The dimension of a path may be classified in terms of space, time, or frequency. For example, in case of a plurality of antennas, a plurality of paths may be formed in the spatial dimension.

If an electronic device (e.g., a mobile phone) performs diversity reception using a plurality of antennas, the wireless communication device may include a plurality of hardware modules for processing the signals received through the antennas. In this case, where signals received through different antennas are processed using different hardware modules, path independence is ensured, and when combined, the gain of the signal may increase. In general, diversity reception improves as the number of signal paths increases.

In addition, an electronic device that uses a plurality of antennas may improve its reception capability by performing Carrier Aggregation (CA). CA is a wideband communication scheme that uses different carrier frequencies. Each CA carrier is called a component carrier (CC). Since resources of the respective carriers are independently scheduled, the electronic device may receive data simultaneously through the respective carriers. For this, the electronic device supporting the CA may include Radio Frequency (RF) and baseband signal processing modules corresponding to the respective carriers.

As described above, an electronic device operating in a Carrier Aggregation (CA) mode may perform communication with a wide bandwidth by simultaneously using carriers of different frequencies. However, even if CA is supported, the electronic device may not always operate in the CA mode. Occasionally, the electronic device may not always operate in the CA mode. Occasionally, the electronic device may operate in a non-CA mode. In the non-CA reception mode, according to a user's usage environment (e.g., a manner of holding the device with a hand, locations of a head and a terminal, and the like), an error may occur in a signal reception of an antenna. In this case, there is a problem in that reception (RX) signal quality may be significantly decreased.

SUMMARY

The present disclosure has been made to address the above-mentioned problems and disadvantages, and to provide at least the advantages described below. Accordingly, an aspect of the present disclosure is to provide an apparatus and method for performing diversity reception in an electronic device.

In accordance with an aspect of the present disclosure, an electronic device is provided. The electronic device includes a first transceiver configured to process a first carrier, a second transceiver configured to process a second carrier, a switch, a baseband processor configured to process a first baseband signal and a second baseband signal, which are processed respectively by the first transceiver and the second transceiver, an antenna connected through the switch in association with some of a plurality of reception paths with respect to the first carrier, and a second reception path configured to provide the second transceiver with the first carrier received via the antenna connected through the switch to the second transceiver.

In accordance with another aspect of the present disclosure, a method of controlling an electronic device is provided. The method includes processing a first carrier via a first transceiver when the first carrier is received, if a second carrier is not processed, providing the second transceiver with the first carrier received via an antenna connected to the second transceiver through a switch and processing the second carrier by the second transceiver when the second carrier is received, and demodulating and decoding a baseband signal of the first carrier processed by the first transceiver and a baseband signal of the first carrier processed by the second transceiver.

In accordance with another aspect of the present disclosure, an electronic device is provided. The electronic device includes a first transceiver configured to process a reception (RX) signal of a first carrier when operating in a Carrier Aggregation (CA) mode, a second transceiver configured to process an RX signal of a second carrier when operating in the CA mode, and a baseband processor configured to demodulate and decode a signal processed by the first transceiver and the second transceiver, wherein the second transceiver converts an RX signal of the first carrier to a baseband signal when operating in a non-CA mode, and wherein the baseband processor is provided with a baseband signal of the first carrier from the first transceiver via an input means corresponding to the first transceiver and is provided with a baseband signal of the first carrier from the second transceiver via an input means corresponding to the second transceiver, and thereafter provides the baseband signals to one processing module through internal routing to combine the baseband signals.

In accordance with another aspect of the present disclosure, an electronic device is provided. The electronic device includes a first antenna, a second antenna, and a third antenna, a first transceiver and a second transceivers configured to receive at least one of a first signal and a second signal via the first antenna, the second antenna, and the third antenna, wherein if the first signal is not received, the first transceiver receives the second signal via the first antenna and the second antenna, and wherein the second transceiver is configured to receive the second signal via the third antenna.

In accordance with another aspect of the present disclosure, a method of performing a communication via an electronic device is provided. The method includes receiving at least one of a first signal and a second signal via at least one of a first antenna, a second antenna, and a third antenna, and providing the first signal or the second signal to a first transceiver or a second transceiver, wherein the providing includes, if the second signal is not received, providing the first transceiver with the first signal received via the first antenna and the second antenna, and providing the second transceiver with the first signal received via the third antenna.

BRIEF DESCRIPTION OF THE DRAWINGS

The above and other aspects, features and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
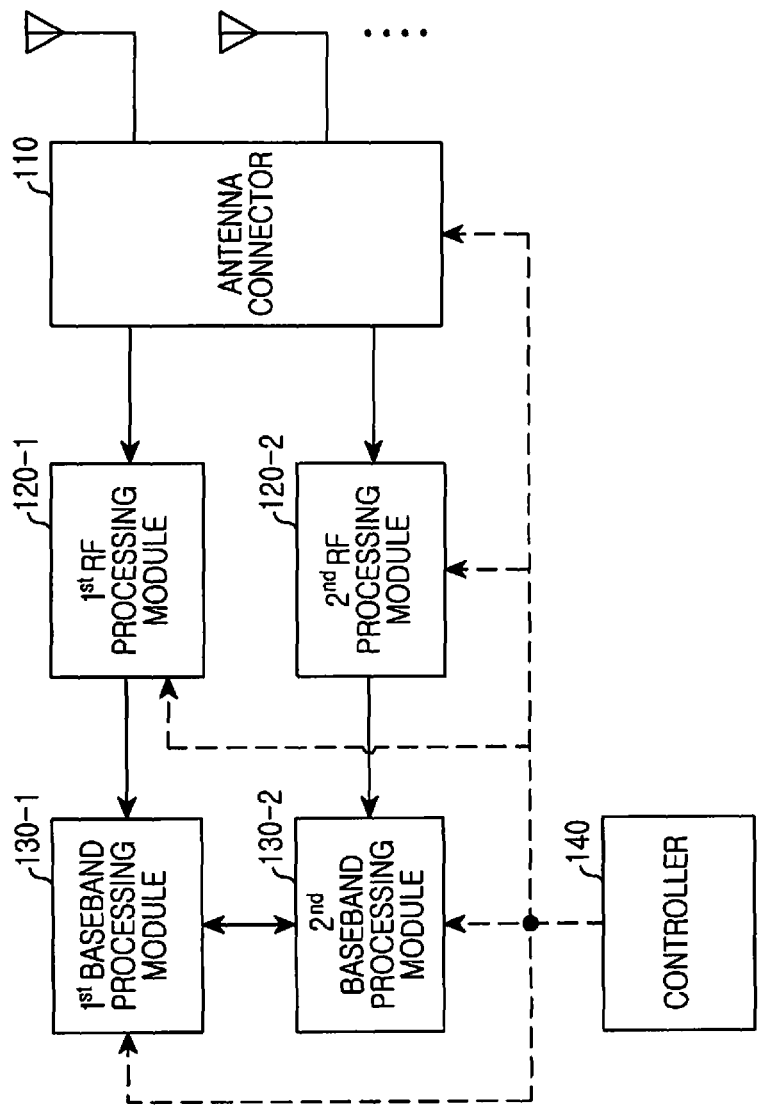
FIG. 1 illustrates a block diagram of an electronic device for a wireless communication according to an embodiment of the present disclosure.

Hereinafter, diversity reception for a wireless communication according to embodiments of the present disclosure is described. Terms used to refer to hardware modules hereinafter are for convenience of explanation. Therefore, the present disclosure is not limited to the terms described hereinafter, and other terms may also be used to refer to objects having the same technical meaning.

Hereinafter, for convenience of explanation, the present disclosure uses terms and names defined in $3^{rd}$ Generation Partnership Project Long Term Evolution (3GPP LTE) and/or LTE-Advanced (LTE-A) standards (e.g., 3GPP TS 36.300 v10.3). However, the present disclosure is not limited to the terms and names, but is equally applicable to a system conforming to other standards. In addition, it will be apparent to those of ordinary skill in the art that various changes and modifications of the embodiments of the present disclosure can be made without departing from the scope and spirit of the present disclosure.

An electronic device according to the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a personal digital assistant, a portable multimedia player, a Moving Picture Experts Group 1 (MPEG1) Audio Layer 3 (MP3) player, a mobile medical device, a camera, and a wearable device (e.g., a head-mounted-device such as electronic glasses, electronic clothes, an electronic bracelet, an electronic necklace, an electronic appcessory, an electronic tattoo, a smart watch, etc.).

According to the present disclosure, the electronic device may be a smart white appliance having a communication function. For example, the smart white appliance may include at least one of a television (TV), a digital video disk player, an audio player, a refrigerator, an air conditioner, a cleaner, an oven, a microwave oven, a washing machine, an air purifier, a set-top box, a TV box (e.g., Samsung Home-Sync™, Apple TV™, or Google TV™), a game console, an electronic dictionary, an electronic key, a camcorder, and an electronic picture frame.

According to the present disclosure, the electronic device may include at least one of various medical devices (e.g., magnetic resonance angiography, magnetic resonance imaging, computed tomography, imaging equipment, ultrasonic instrument, and the like), a navigation device, a Global Positioning System (GPS) receiver, an event data recorder, a flight data recorder, a car infotainment device, an electronic equipment for a ship (e.g., a vessel navigation device, a gyro compass, and the like), avionics, a security device, and an industrial or domestic robot.

According to the present disclosure, the electronic device may include at least one of a piece of furniture or a part of building/construction including a communication function, an electronic board, an electronic signature input device, a projector, and various measurement devices (e.g., water supply, electricity, gas, propagation measurement device, and the like). The electronic device according to the present disclosure may be one or more combinations of the aforementioned devices. In addition, it will be apparent to those of ordinarily skilled in the art that the present disclosure is not limited to the aforementioned devices.

If diversity reception is performed using a plurality of antennas, the electronic device may include a plurality of signal processing modules.

According to the present disclosure, the electronic device performs diversity reception using a plurality of signal processing modules (e.g., transceivers) provided for different purposes. For example, if the signal processing modules provided for the different purposes are not presently being used, the electronic device may perform diversity reception using a signal processing module presently being used for signal reception and a signal processing module which is not presently being used. For example, signal processing modules for respective carriers of the electronic device supporting Carrier Aggregation (CA) of an LTE-A system may be used.

Even if the electronic device supports the CA, it may operate in a single-carrier mode under the control of a network. The single-carrier mode may be referred to as a non-CA mode. For example, such a case may include a case where a resource of a specific Carrier Component (CC) has reached full capacity (i.e., is saturated) and thus only one CC can be allocated, a case where an amount of data to be transmitted to a corresponding electronic device may be sufficiently transmitted using only one CC. In a case of operating in the single-carrier mode, signal processing modules for a second carrier, e.g., a secondary carrier, may not be activated or may not be used. In addition, even in a case of operating in the CA mode, if a resource is not allocated at the second carrier in a specific duration, the signal processing module for the second carrier may not be activated in the specific duration. In this case, the number of signal processing modules which are not activated may vary according to the maximum number of CCs that can be supported by the electronic device.

As described above, in case of the electronic device supporting the CA, some of the signal processing modules may be deactivated according to an operation mode or a resource allocation situation. In this case, according to various embodiments of the present disclosure, the electronic device may use a signal processing module for an unscheduled carrier to perform diversity reception with respect to a signal of a scheduled carrier. Herein, when it is said that the carrier is "unscheduled", it may include a case of operating in the single-carrier mode or a case where a resource is not allocated for one carrier in a specific duration of the CA mode.

In addition, for diversity reception, a Reception (RX) antenna is required in addition to the signal processing module. According to an embodiment of the present disclosure, the electronic device may use an antenna installed for a different purpose other than communicating with a transmitting apparatus (e.g., a base station (BS)). According to another embodiment of the present disclosure, the electronic device may use an antenna implemented for a signal processing module which is not used temporarily.

FIG. 1 illustrates a block diagram of an electronic device for a wireless communication according to an embodiment of the present disclosure. In FIG. 1, the electronic device includes two signal processing modules. However, an electronic device according to another embodiment of the present disclosure may include three or more signal processing modules.

Referring to FIG. 1, the electronic device includes an antenna connector 110, a first Radio Frequency (RF) processing module 120-1, a second RF processing module 120-2, a first baseband processing module 130-1, a second baseband processing module 130-2, and a controller 140.

The antenna connector 110 connects a plurality of antennas to the first RF processing module 120-1 and the second RF processing module 120-2. Accordingly, signals received through the plurality of antennas are provided to the first RF processing module 120-1 and the second RF processing module 120-2. For this, the antenna connector 110 includes at least one antenna switch, at least one diplexer, and at least one band-pass filter. The antenna connector 110 is connected to at least one antenna corresponding to the first RF processing module 120-1 and at least one antenna corresponding to the second RF processing module 120-2. In addition, the antenna connector 110 may be connected to at least one antenna for a different communication module not shown in FIG. 1. For example, the different communication module may be a communication means for Bluetooth, Wireless Fidelity (Wi-Fi), Global Positioning System (GPS), Digital Multimedia Broadcasting (DMB), Near Field Communication (NFC), and the like. In this case, the antenna connector 110 may provide a signal received via the antenna for the different communication module to at least one of the first RF processing module 120-1 and the second RF processing module 120-2 under the control of the controller 140.

The first RF processing module 120-1 and the second RF processing module 120-2 process RF signals received via the antennas. For example, each of the first RF processing module 120-1 and the second RF processing module 120-2 may include a filter, an amplifier, a mixer, an oscillator, an analog-to-digital converter (ADC), and the like. Each of the first RF processing module 120-1 and the second RF processing module 120-2 is commonly referred to as a "transceiver."

The first baseband processing module 130-1 and the second baseband processing module 130-2 perform a conversion function between an RF signal and a bit-stream. For example, the first baseband processing module 130-1 and the second baseband processing module 130-2 convert RF signals, provided from the first RF processing module 120-1 and the second RF processing module 120-2, to baseband signals, and restore RX bit-streams through demodulation and decoding. For example, in an orthogonal frequency division multiplexing scheme, the first baseband processing module 130-1 and the second baseband processing module 130-2 restore signals obtained by mapping baseband signals to subcarriers through a Fast Fourier Transform operation, and thereafter restore RX bit-streams through demodulation and decoding. The first baseband processing module 130-1 and the second baseband processing module 130-2 are commonly referred to as baseband modems. In addition, the first baseband processing module 130-1 and the second baseband processing module 130-2 may be sub-blocks in one modem block. The first baseband processing module 130-1 and the second baseband processing module 130-2 may be included in one modem chip, or may be constructed of separate modem chips.

The first RF processing module 120-1, the second RF processing module 120-2, the first baseband processing module 130-1, and the second baseband processing module 130-2 process RX signals. On the basis thereof, the first RF processing module 120-1, the second RF processing module 120-2, the first baseband processing module 130-1, and the second baseband processing module 130-2 are referred to as "RX modules." In this case, the first RF processing module 120-1 and the second RF processing module 120-2 constitute one RX module, and the first baseband processing module 130-1 and the second baseband processing module 130-2 constitute another RX module. FIG. 1 illustrates two RX modules.

The controller 140 provides overall control to the electronic device. The controller 140 may be referred to as a "processor" or a "processing unit." For example, the processing unit may be a set of two or more processers. In another example, the controller 140 may be an application processor (AP) for controlling hardware and software elements and processing and operating a variety of data or a part of the AP, or may be a communication processor (CP) for managing a data link in a communication and converting a communication protocol or a part of the CP. The AP may be implemented in one integrated circuit. The controller 140 controls signals received via the first and second RF processing modules 120-1 and 120-2 and the first and second baseband processing modules 130-1 and 130-2. According to an embodiment of the present disclosure, the controller 140 controls the antenna connector 110, the first and second RF processing modules 120-1 and 120-2, and the first and second baseband processing modules 130-1 and 130-2 to perform diversity reception. For this, the controller 140 stores a rule for controlling each module in the electronic device according to a state of the electronic device. For example, the state may include at least one of an operation mode of the electronic device and scheduling for carriers.

According to an embodiment of the present disclosure, under the control of the controller 140, the first and second RF processing modules 120-1 and 120-2 and the first and second baseband processing modules 130-1 and 130-2 may respectively process a signal of a first carrier and a signal of a second carrier. Alternatively, the first and second RF processing modules 120-1 and 120-2 and the first and second baseband processing modules 130-1 and 130-2 may simultaneously process the signal of the first carrier and the signal of the second carrier. In addition, the second baseband processing module 130-2 may provide a received baseband signal to the first baseband processing module 130-1 to combine signals. In this case, the first baseband processing module 130-1 may combine an autonomously processed signal with a signal received by the second band processing module 130-2. In this case, the first baseband processing module 130-1 may combine signals according to various schemes. For example, maximal ratio combining, in-phase combining, uniform gain combining, simple selection or antenna selection switching, and the like may be used. Further, if signals are received via three or more paths, the first baseband processing module 130-1 may selectively combine only some of signals to be provided.

Figure 2:
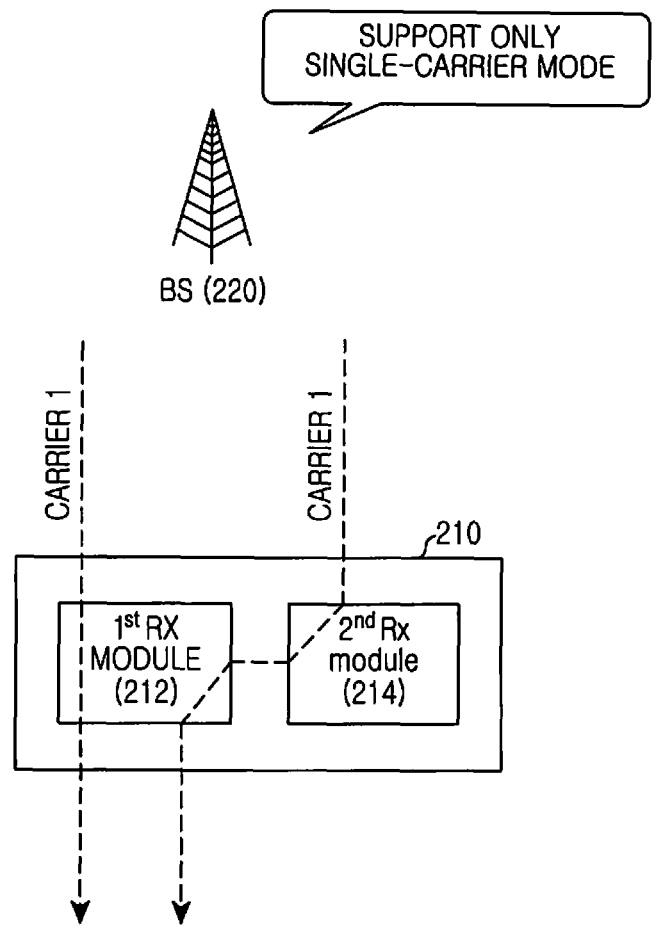
FIG. 2 illustrates an operation start point of diversity reception using an unused reception (RX) module according to an embodiment of the present disclosure.

FIG. 2 illustrates an operation start point of diversity reception using an unused RX module according to an embodiment of the present disclosure.

Referring to FIG. 2, an electronic device 210 includes a first RX module 212 and a second RX module 214 to support a CA mode. The first and second RX modules 212 and 214 respectively correspond to the RF processing module and the baseband processing module of FIG. 1. For example, the first RX module 212 includes the first RF processing module 120-1 and the first baseband processing module 130-1 of FIG. 1, and the second RX module 214 includes the second RF processing module 120-2 and the second baseband processing module 130-2 of FIG. 1.

The electronic device 210 of FIG. 2 may receive a signal from a BS 220. For example, in an embodiment of the present disclosure, the BS 220 supports only a single-carrier mode and a non-CA mode. For example, the BS 220 may be designed to not support the CA mode, or to not support the CA mode temporarily. Accordingly, the BS 220 transmits only one carrier signal. In this case, the electronic device may use the first RX module 212 and the second RX module 214 to process the carrier signal. Since the electronic device 210 does not receive a plurality of carrier signals, the first RX module 212 and the second RX module 214 may be allocated as reception paths for the carrier signal. In this case, although not shown in FIG. 2, the electronic device 210 may receive a signal to be processed via the second RX module 214, via an antenna provided for a different purpose other than communication with the BS 220 or an antenna which is not presently being used. The carrier signal processed in the second RX module 214 may be combined with a signal processed in the first RX module 212.

Although not shown in FIG. 2, the electronic device 210 may further include another RX module for the carrier signal. In this case, the electronic device 210 performs diversity reception by combining three or more signals. The electronic device 210 enables diversity reception or increases the number of signals that may be used for diversity reception. For example, if the electronic device 210 has two RX antennas for diversity reception, a reception path for diversity reception may be increased from two to three or more according to an embodiment of the present disclosure.

In FIG. 2, the first RX module 212 and the second RX module 214 are configured to process signals of different carriers. The present disclosure may be equally applied to a case where the first RX module 212 and the second RX module 214 are configured for different access networks. For example, in a case where the first RX module 212 is configured to support a global system for mobile communications or a 1xCode Division Multiple Access (1xCDMA) or wideband CDMA system as a Long Term Evolution (LTE) system, the aforementioned embodiment of the present disclosure may be similarly applied.

Figure 3:
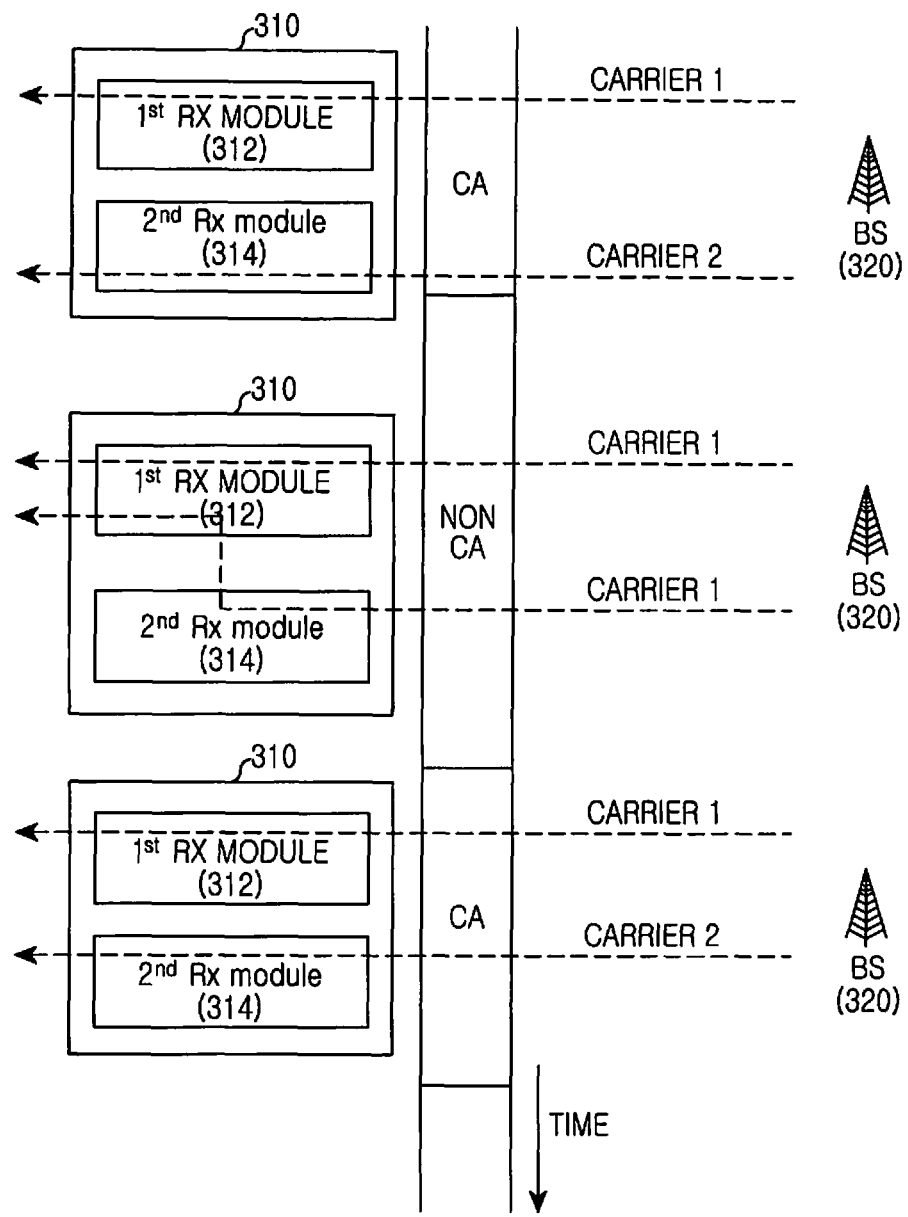
FIG. 3 illustrates an operation start point of diversity reception using an unused RX module according to an embodiment of the present disclosure.

FIG. 3 illustrates an operation start point of diversity reception using an unused RX module according to an embodiment of the present disclosure. Diversity reception based on an operation mode of an electronic device is shown in FIG. 3.

Referring to FIG. 3, an electronic device 310 includes a first RX module 312 and a second RX module 314 to support a CA mode. The first and second RX modules 312 and 314 respectively correspond to the RF processing module and the baseband processing module of FIG. 1. For example, the first RX module 312 includes the first RF processing module 120-1 and the first baseband processing module 130-1 of FIG. 1, and the second RX module 314 includes the second RF processing module 120-2 and the second baseband processing module 130-2 of FIG. 1.

The electronic device 310 receives a signal from a BS 320. In this case, the electronic device 310 may operate in one of a CA mode and a non-CA mode. A change between the CA mode and the non-CA mode depends on control of the BS 320.

For example, if the electronic device 310 operates in the CA mode, the electronic device 310 receives a first carrier signal (carrier-1) and a second carrier signal (carrier-2). Accordingly, the electronic device 310 processes the carrier-1 signal using the first RX module 312, and processes the carrier-2 signal using the second RX module 314. That is, the first RX module 312 and the second RX module 314 are respectively activated to process different signals.

Alternatively, if the electronic device 310 operates in the non-CA mode, the electronic device 310 receives only the carrier-1 signal. When only one signal is to be delivered to the electronic device 310, only the carrier-1 signal is transmitted, but the BS 320 may further transmit the carrier-2 signal for another electronic device. In the case where only the carrier-1 signal is transmitted, the electronic device 310 uses both the first RX module 312 and the second RX module 314 to process the carrier-1 signal. For example, the electronic device 310 assigns the first RX module 312 and the second RX module 314 as reception paths for the carrier-1 signal. In this case, although not shown in FIG. 3, the electronic device 310 receives a signal to be processed via the second RX module 314, by using an antenna provided for a different purpose other than a communication with the BS 310 or a different antenna which is presently not being used. The carrier-1 signal processed in the second RX module 314 is combined with a signal processed in the first RX module 312.

In another case, not shown in FIG. 3, the electronic device 310 operates in the non-CA mode and receives only the carrier-2 signal. In this case, the electronic device 310 uses the first RX module 312 and the second RX module 314 to process the carrier-2 signal. For example, the electronic device 310 assigns the first RX module 312 and the second RX module 314 as reception paths for the carrier-2 signal. The carrier-2 signal processed in the second RX module 314 is provided to the second RX module 314 and is then combined with a signal processed in the second RX module 314.

Thereafter, if the electronic device 310 operates again in the CA mode, the electronic device 310 receives the carrier-1 signal and the carrier-2 signal. Accordingly, the electronic device 310 processes the carrier-1 signal using the first RX module 312, and processes the carrier-2 signal using the second RX module 314. The first RX module 312 and the second RX module 314 are respectively activated to process different signals.

Although not shown in FIG. 3, the electronic device 310 may further include at least one additional RX module for carrier-1. In this case, the electronic device 310 performs diversity reception by combining three or more signals. In the present disclosure, the electronic device 310 enables diversity reception or increases the number of signals that may be used for diversity reception. For example, if the electronic device 310 has three RX antennas for diversity reception, the number of reception paths for diversity reception is increased from two to three.

Figure 4:
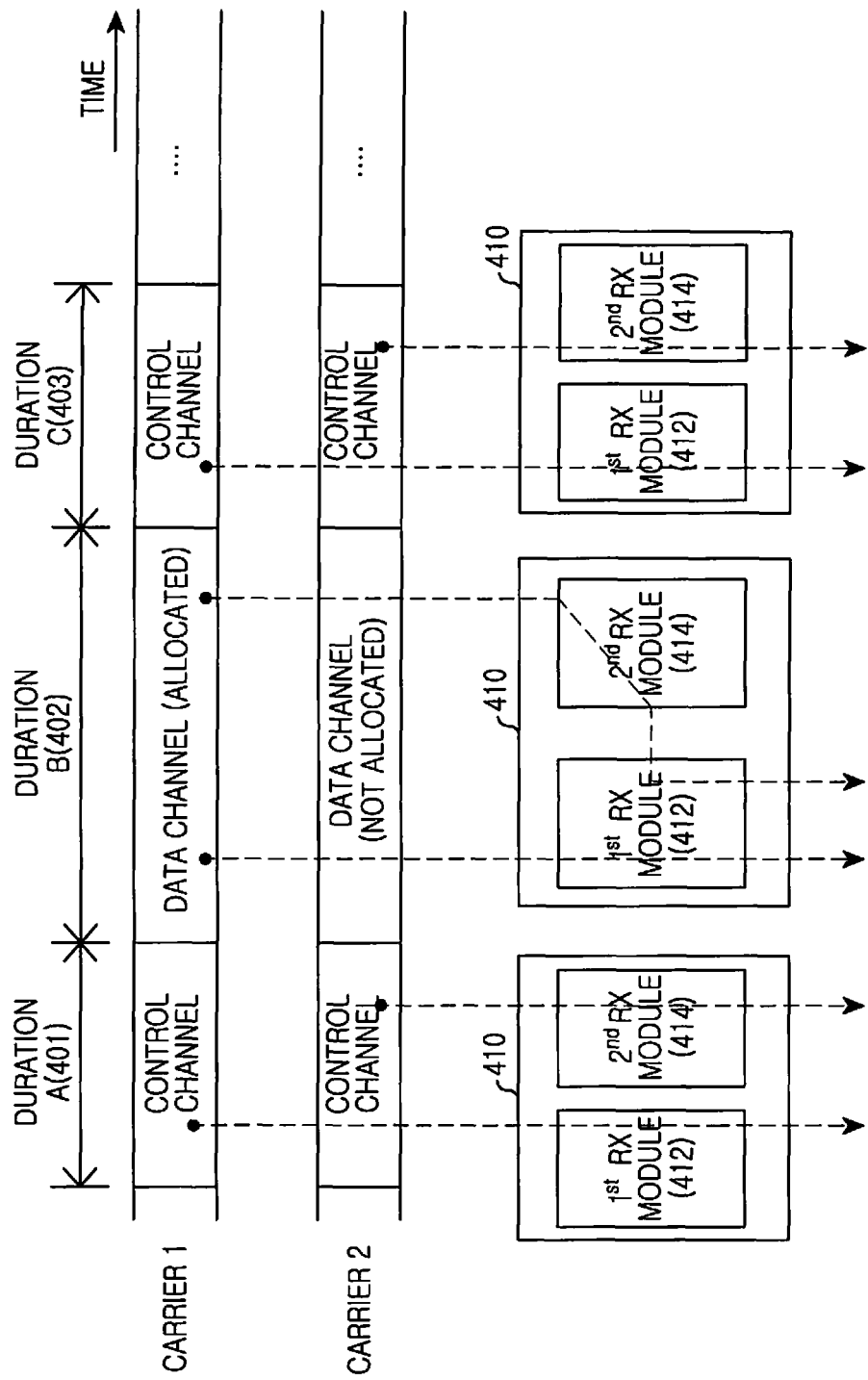
FIG. 4 illustrates an operation start point of diversity reception using an unused RX module according to an embodiment of the present disclosure.

FIG. 4 illustrates an operation start point of diversity reception using an unused RX module according to an embodiment of the present disclosure. Diversity reception shown in FIG. 4 is based on whether a resource is allocated to a data channel.

Referring to FIG. 4, an electronic device 410 includes a first RX module 412 and a second RX module 414 to support a CA mode. The RX modules 412 and 414 may respectively correspond to the RF processing module and the baseband processing module of FIG. 1. For example, the first RX module 412 includes the first RF processing module 120-1 and the first baseband processing module 130-1 of FIG. 1, and the second RX module 414 includes the second RF processing module 120-2 and the second baseband processing module 130-2 of FIG. 1.

The electronic device 410 receives a signal from a BS. In FIG. 4, the electronic device 410 operates in a CA mode. Accordingly, the BS transmits a carrier-1 signal and a carrier-2 signal to the electronic device 410. The carrier-1 signal and the carrier-2 signal may respectively include a control channel and a data channel. The control channel may include resource allocation information for the data channel, and must be decoded by the electronic device 410 to perform a communication by using a corresponding carrier. The data channel is a region for delivering traffic, and may be allocated or may not be allocated to the electronic device 410 according to a scheduling result in the BS. If the data channel is not allocated, the electronic device 410 may not receive a signal during a corresponding duration.

In duration A 401, control channels of carrier-1 and carrier-2 are transmitted. Accordingly, the electronic device 410 processes the carrier-1 signal using the first RX module 412, and processes the carrier-2 signal using the second RX module 414. Accordingly, the electronic device 410 decodes the control channels of carrier-1 and carrier-2. The first RX module 412 and the second RX module 414 are respectively activated to process different signals.

In duration B 402, the data channel of carrier-1 and carrier-2 are transmitted. In this case, for example, the data channel is not allocated to carrier-2. Whether a data channel is allocated or not may be determined from decoding the control channel. The electronic device 410 may use the first RX module 412 and the second RX module 414 to process the carrier-1 signal. Since the electronic device 410 does not receive the carrier-2 signal, the first RX module 412 and the second RX module 414 may be allocated as reception paths for the carrier-1 signal. In this case, the second RX module 414 receives either a full duration or a partial duration of the data channel of the carrier-1 signal. Although not shown in FIG. 4, the electronic device 410 may receive a signal to be processed via the second RX module 414, by using an antenna provided for a different purpose other than a communication with the BS or a different antenna which is not presently being used. The carrier-1 signal processed in the second RX module 414 may be provided to the first RX module 412 and combined with a signal processed in the first RX module 212.

In duration C 403, a control channel of carrier-1 and carrier-2 are transmitted. Accordingly, the electronic device 410 processes the carrier-1 signal using the first RX module 412, and processes the carrier-2 signal using the second RX module 414. Accordingly, the electronic device 410 decodes the control channels of carrier-1 and carrier-2. The first RX module 412 and the second RX module 414 are respectively activated to process different signals.

Although not shown in FIG. 4, the electronic device 410 may further include at least one additional RX module for carrier-1. In this case, the electronic device 410 performs diversity reception by combining three or more signals. According to a structure of the electronic device 410, the present disclosure enables diversity reception or increases the number of signals that may be used for diversity reception. For example, if the electronic device 410 has two RX antennas for diversity reception, a reception path for diversity reception may be increased from two to three or more according to the present disclosure.

Hereinafter, to facilitate the understanding of the present disclosure, various embodiments of the present disclosure are described with reference to examples of a configuration.

In the following description, a "high band" and a "low band" are used to indicate carriers divided in frequency. The high band and the low band are relative concepts, and may be defined differently.

Figure 5:
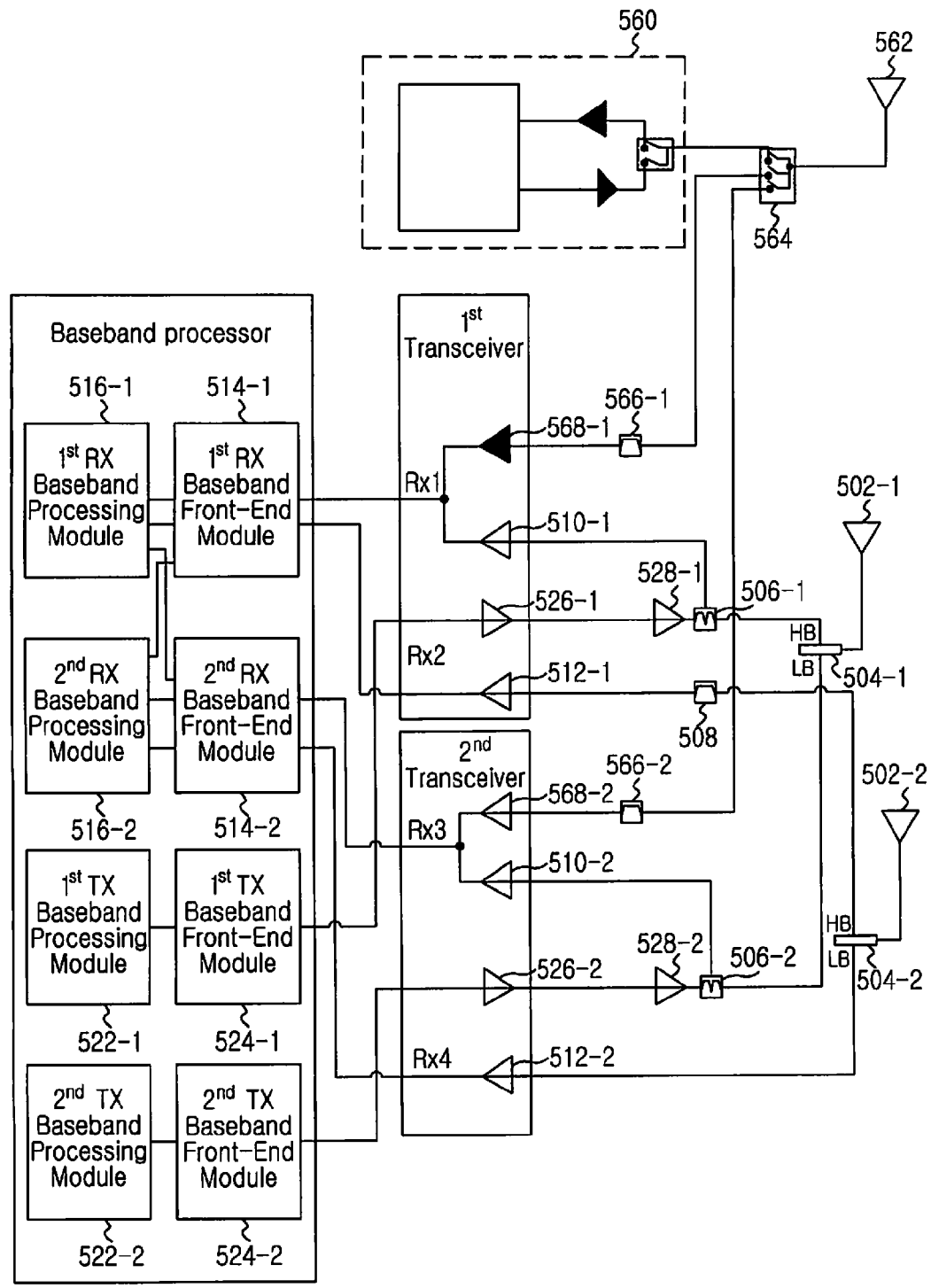
FIG. 5 illustrates an electronic device for a wireless communication according to an embodiment of the present disclosure.

FIG. 5 illustrates a structure of an electronic device for a wireless communication according to an embodiment of the present disclosure. In FIG. 5, one additional antenna may be utilized for a communication means other than a communication with a BS.

Referring to FIG. 5, the electronic device includes a first antenna 502-1 and a second antenna 502-2. The first antenna 502-1 is connected to a first diplexer 504-1. The first diplexer 504-1 separates a transmitted (TX) signal into a first signal (e.g., a high-band signal) and a second signal (e.g., a low-band signal), and outputs the first signal towards a first transceiver and the second signal towards a second transceiver. The second antenna 502-2 is connected to a second diplexer 504-2. The second diplexer 504-2 separates a TX signal into a first signal and a second signal, and outputs the first signal towards the first transceiver and the second signal towards the second transceiver.

The first transceiver and the second transceiver convert a provided RF signal to a baseband signal. Although only amplifiers of the first transceiver and the second transceiver are shown in FIG. 5, the first transceiver and the second transceiver further include a filter, an oscillator, a mixer, an ADC, and the like.

The first signal output from the first diplexer 504-1 is provided to an amplifier 510-1 in the first transceiver via a first duplexer 506-1. The first duplexer 506-1 allows bidirectional communication over a single path for a TX signal and an RX signal, provides a signal received via the first antenna 502-1 to the amplifier 510-1, and provides a TX signal provided from the first transceiver to the first antenna 502-1. A signal amplified by the amplifier 510-1 is provided to a first RX baseband front-end module 514-1 in a baseband processor. The first signal output from the second diplexer 504-2 is provided to an amplifier 512-1 of the first transceiver via a band-pass filter 508. A signal amplified by the amplifier 512-1 is provided to the first RX baseband front-end module 514-1 in the baseband processor. Thereafter, the first RX baseband front-end module 514-1 provides a signal to a first RX baseband processing module 516-1. The first RX baseband front-end module 514-1 and first RX baseband processing module 516-1 may be separate modules in a modem chip or integrated circuit, or may be one integrated module.

The second signal output from the first diplexer 504-1 is provided to an amplifier 510-2 in the second transceiver via a second duplexer 506-2. A signal amplified by the amplifier 510-2 is provided to a second RX baseband front-end module 514-2 in the baseband processor. The second signal output from the second diplexer 504-2 is provided to an amplifier 512-2 of the second transceiver. A signal amplified by the amplifier 512-2 is provided to the second RX baseband front-end module 514-2 in the baseband processor. Thereafter, the second RX baseband front-end module 514-2 provides a signal to a second RX baseband processing module 516-2. The second RX baseband front-end module 514-2 and the second RX baseband processing module 516-2 may be separate modules in a modem chip or integrated circuit, or may be one integrated module.

The baseband processor includes a first TX baseband processing module 522-1 and a first TX baseband front-end module 524-1 to process a TX signal in the high band, and includes a second TX baseband processing module 522-2 and a second TX baseband front-end module 524-2 to process a signal in the low band. The first TX baseband processing module 522-1 provides a baseband signal to be transmitted through the high band to the first TX baseband front-end module 524-1. The first TX baseband processing module 522-1 and the first TX baseband front-end module 524-1 may be separate modules in a modem chip or integrated circuit, or may be one integrated module. The first TX baseband front-end module 524-1 provides a TX signal to an amplifier 526-1 in the first transceiver. A signal amplified in the amplifier 526-1 is transmitted through the first antenna 502-1 via an amplifier 528-1, the first duplexer 506-1, and the first diplexer 504-1. The second TX baseband processing module 522-2 provides the second TX baseband front-end module 524-2 with a baseband signal to be transmitted through the low band. The second TX baseband processing module 522-2 and the second TX baseband front-end module 524-2 may be separate modules in a modem chip or integrated circuit, or may be one integrated module. The second TX baseband front-end module 524-2 provides a TX signal to an amplifier 526-2 in the second transceiver. A signal amplified in the amplifier 526-2 is transmitted through the first antenna 502-1 via an amplifier 528-2, the second duplexer 506-2, and the first diplexer 504-1. In FIG. 5, the TX signal provided to the first transceiver is amplified by the two amplifiers 526-1 and 528-1, and the two amplifiers 526-1 and 528-1 may amplify signals of different bands. For example, the amplifier 526-1 of a first stage may amplify an intermediary band of the TX signal, and the amplifier 528-1 of a next stage may amplify a low band of the TX signal.

An additional antenna 562 may be connected to the first transceiver, the second transceiver, or a different communication unit 560 through a switch 564. For example, the different communication unit 560 may include one of a Bluetooth module, a Wi-Fi module, a GPS module, a DMB module, and an NFC module. Although one different communication unit 560 is illustrated in FIG. 5, a plurality of other communication units maybe included, and thus a plurality of additional antennas maybe included. Although not shown in FIG. 5, the different communication units 560 may include a third transceiver.

The baseband process of FIG. 5 includes the first RX baseband processing module 516-1, the second RX baseband processing module 516-2, the first TX baseband processing module 522-1, and the second TX baseband processing module 522-2. In this case, the first RX baseband processing module 516-1, the second RX baseband processing module 516-2, the first TX baseband processing module 522-1, and the second TX baseband processing module 522-2 may be included in at least one modem chip or integrated circuit. For example, the first RX baseband processing module 516-1, the second RX baseband processing module 516-2, the first TX baseband processing module 522-1, and the second TX baseband processing module 522-2 may be included in one modem chip or integrated circuit, or may be included separately in a plurality of modem chips.

If diversity reception is performed by using an unused RX module according to an embodiment of the present disclosure, the additional antenna 562 is used as an additional reception path. For this, the additional antenna 562 is connected to the first transceiver and the second transceiver through an antenna switch 564.

For example, if the second transceiver is currently processing the second signal, the antenna switch 564 may be used to receive the second signal through the additional antenna 562 and to output it to the first transceiver. A signal output from the antenna switch 564 is provided to the first transceiver via a first band-pass filter 566-1 which passes a signal in a frequency of the low band, is amplified by an amplifier 568-1 in the first transceiver, and thereafter is provided to the first RX baseband front-end module 514-1. The first RX baseband front-end module 514-1 provides the second signal to the second RX baseband processing module 516-2. In addition, the second transceiver may provide the second RX baseband front-end module 514-2 with at least one second signal received through at least one of the first antenna 502-1 and the second antenna 502-2, and the second RX baseband front-end module 514-2 may provide the at least one second signal to the second RX baseband processing module 516-2. Accordingly, the electronic device may further ensure one path for diversity reception. The second RX baseband processing module 516-2 may combine the second signal received through at least one of the first antenna 502-1, the second antenna 502-2, and the additional antenna 562.

In addition, if the first transceiver is currently processing the first signal, the antenna switch 564 may be used to receive the first signal through the additional antenna 562 and to output it to the second transceiver. In this case, a signal output from the antenna switch 564 is provided to the second transceiver via a second band-pass filter 566-2 which passes a signal of a frequency in the high band, is amplified by an amplifier 568-2 in the second transceiver, and thereafter is provided to the second RX baseband front-end module 514-2. The second RX baseband front-end module 514-2 provides the first signal to the first RX baseband processing module 516-1. In addition, the first transceiver provides the first RX baseband front-end module 514-1 with at least one first signal received through at least one of the first antenna 502-1 and the second antenna 502-2, and the first RX baseband front-end module 514-1 provides the at least one first signal to the first RX baseband processing module 516-1. Accordingly, the electronic device further ensures one path for diversity reception. The first RX baseband processing module 516-1 combines the first signal received through at least one of the first antenna 502-1, the second antenna 502-2, and the additional antenna 562.

Although only one path for signal routing between the first RX baseband front-end module 514-1 and the second RX baseband processing module 516-2 is illustrated in FIG. 5, two or more paths may exist for the signal routing according to the present disclosure. In addition, although only one path for signal routing between the second RX baseband front-end module 514-2 and the first RX baseband processing module 516-1 is illustrated in FIG. 5, two or more paths may exist for the signal routing according to the present disclosure.

Figure 6:
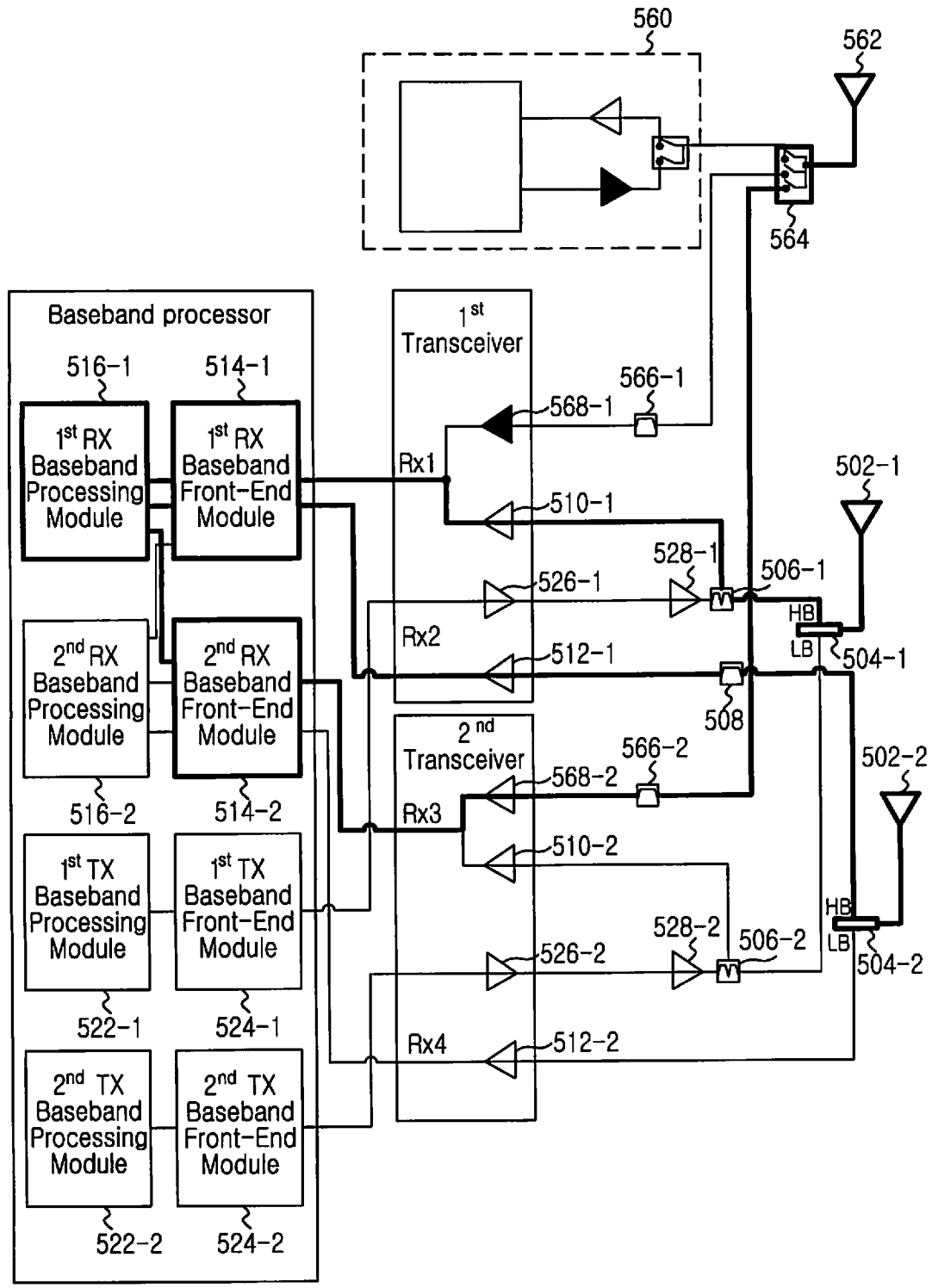
FIG. 6 illustrates a signal processing path of an electronic device according to an embodiment of the present disclosure.

According to FIG. 5, if it is intended to perform an additional diversity reception as to the first signal, signal processing may be performed as shown in FIG. 6. FIG. 6 illustrates a signal processing path of an electronic device according to an embodiment of the present disclosure. In FIG. 6, a signal processing path and activated blocks are indicated by a bold line.

Referring to FIG. 6, if the first signal (e.g., a high-band signal) is received, the first transceiver for the first signal, the first RX baseband front-end module 514-1 in the baseband processor, and the first RX baseband processing module 516-1 may process the first signal. On the other hand, the second transceiver for the second signal, the second RX baseband front-end module 514-2 in the baseband processor, and the second RX baseband processing module 516-2 may not be provided with the second signal. Instead, according to the present disclosure, the second transceiver and second RX baseband front-end module 514-2 in the baseband processor may receive the first signal through the additional antenna 562. For example, the second transceiver and the second RX baseband front-end module 514-2 may receive the first signal through the additional antenna 562 and may provide the signal to the first RX baseband processing module 516-1.

As described above, a plurality of first signals are provided to the first RX baseband processing module 516-1. The plurality of first signals to be provided to the first RX baseband processing module 516-1 is input to the baseband processor. In this case, both of an input means for the first signal and an input means for the second signal are used, and the first signals are collected in the first RX baseband processing module 516-1 through routing in the baseband processor. The input is a medium for delivering a signal from an external element of the baseband processor to an internal element of the baseband processor, and may connect the baseband processor to a path for delivering a signal to the baseband processor. The input may be referred to as a pin or a node, and is constructed of an electrically conductive material.

Accordingly, the first RX baseband processing module 516-1 may acquire a diversity reception gain by combining three first signals received through the first antenna 502-1, the second antenna 502-2, and the additional antenna 562. According to a the present disclosure, the first RX baseband processing module 516-1 may combine the three RX signals or may selectively combine only two signals, that is, may use a diversity reception scheme such as Maximum Ratio Combining (MRC), in-phase combination, constant gain combination, simple selection or antenna selection switching, and the like. In addition to these schemes, other diversity reception schemes may also be applied. For example, the first RX baseband processing module 516-1 may combine only two signals having excellent signal quality. Herein, the signal quality may be determined on the basis of at least one of RX signal strength, Signal to Noise Ratio (SNR), Signal to Interference and Noise Ratio (SINR), antenna correlation, RX signal strength, RX signal's arrival delay time, and the like.

Figure 7:
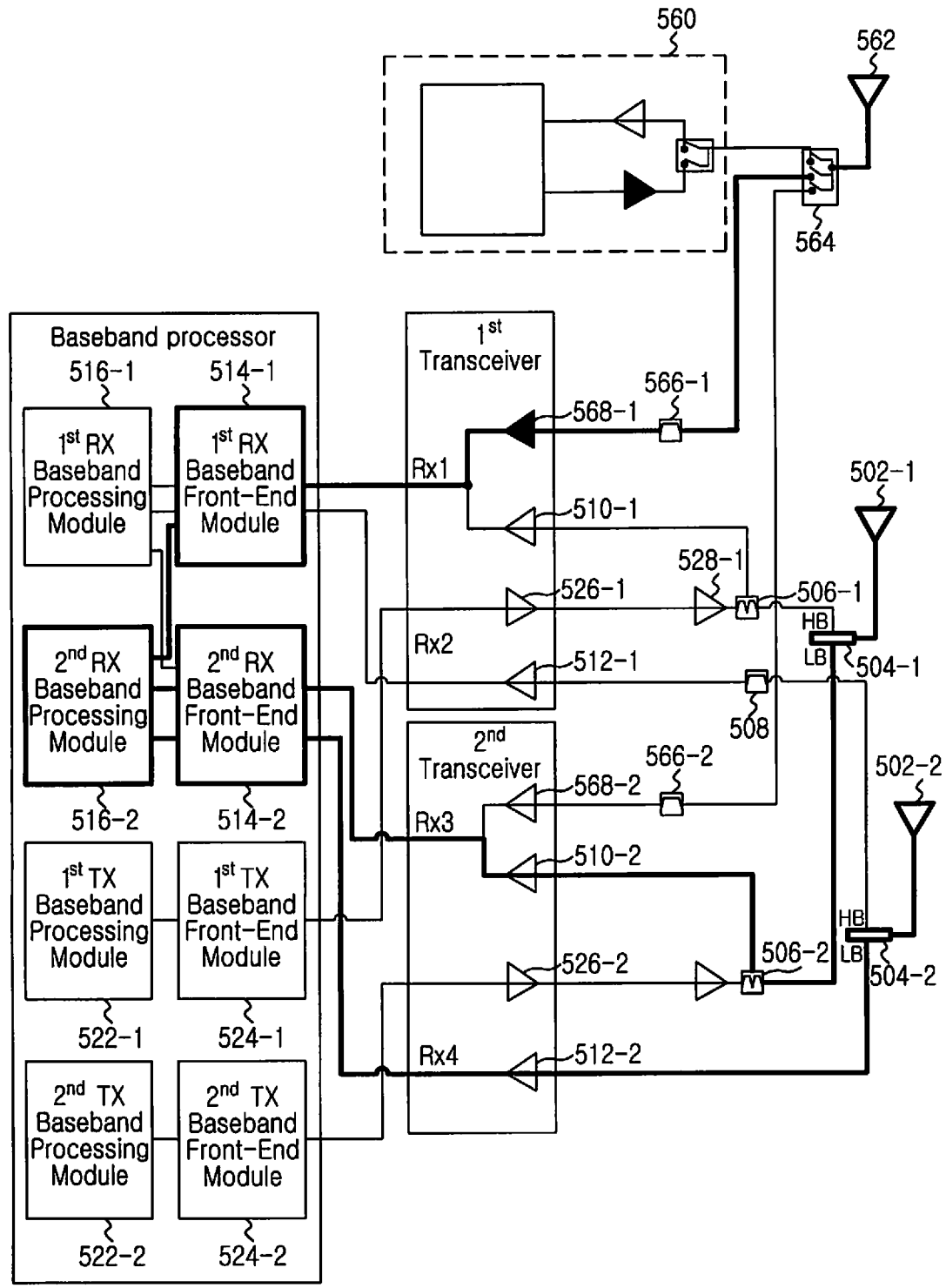
FIG. 7 illustrates a signal processing path of an electronic device according to an embodiment of the present disclosure.

According to FIG. 5, if it is intended to perform an additional diversity reception as to the second signal, signal processing may be performed as shown in FIG. 7. FIG. 7 illustrates a signal processing path of an electronic device according to an embodiment of the present disclosure. In FIG. 7, a signal processing path and activated blocks are indicated by a bold line.

Referring to FIG. 7, if the second signal (e.g., a low-band signal) is received, the second transceiver for the second signal, the second RX baseband front-end module 514-2 in the baseband processor, and the second RX baseband processing module 516-2 may process the second signal. The first transceiver for the first signal, the first RX baseband front-end module 514-1 in the baseband processor, and the first RX baseband processing module 516-1 may not be provided with the first signal. Instead, according to the present disclosure, the first transceiver and first RX baseband front-end module 514-1 in the baseband processor may process the second signal received through the additional antenna 562. The first transceiver and the first RX baseband front-end module 514-1 in the baseband processor may receive the second signal through the additional antenna 562 and may provide the second signal to the second RX baseband processing module 516-2.

As described above, a plurality of second signals are provided to the second RX baseband processing module 516-2. The plurality of second signals provided to the second RX baseband processing module 516-2 are input to the baseband processor. In this case, both an input for the first signal and an input for the second signal are used, and the second signals are collected in the second RX baseband processing module 516-2 through routing in the baseband processor. The input is a medium for delivering a signal from an external element of the baseband processor to an internal element of the baseband processor, and may connect the baseband processor to a path for delivering a signal to the baseband processor. The input may be referred to as a pin or a node, and is constructed of an electrically conductive material.

Accordingly, the second RX baseband processing module 516-2 may acquire a diversity reception gain by combining three second signals received through the first antenna 502-1, the second antenna 502-2, and the additional antenna 562. According to the present disclosure, the second RX baseband processing module 516-2 may combine all of the three RX signals or may selectively combine only two signals, that is, may use a diversity reception scheme such as MRC, in-phase combination, constant gain combination, simple selection or antenna selection switching, and the like. In addition to these schemes, other diversity reception schemes may also be applied. For example, the second RX baseband processing module 516-2 may combine only two signals having excellent signal quality. Herein, the signal quality may be determined on the basis of at least one of RX signal strength, SNR, SINR, antenna correlation, RX signal strength, RX signal's arrival delay time, and the like.

Figure 8:
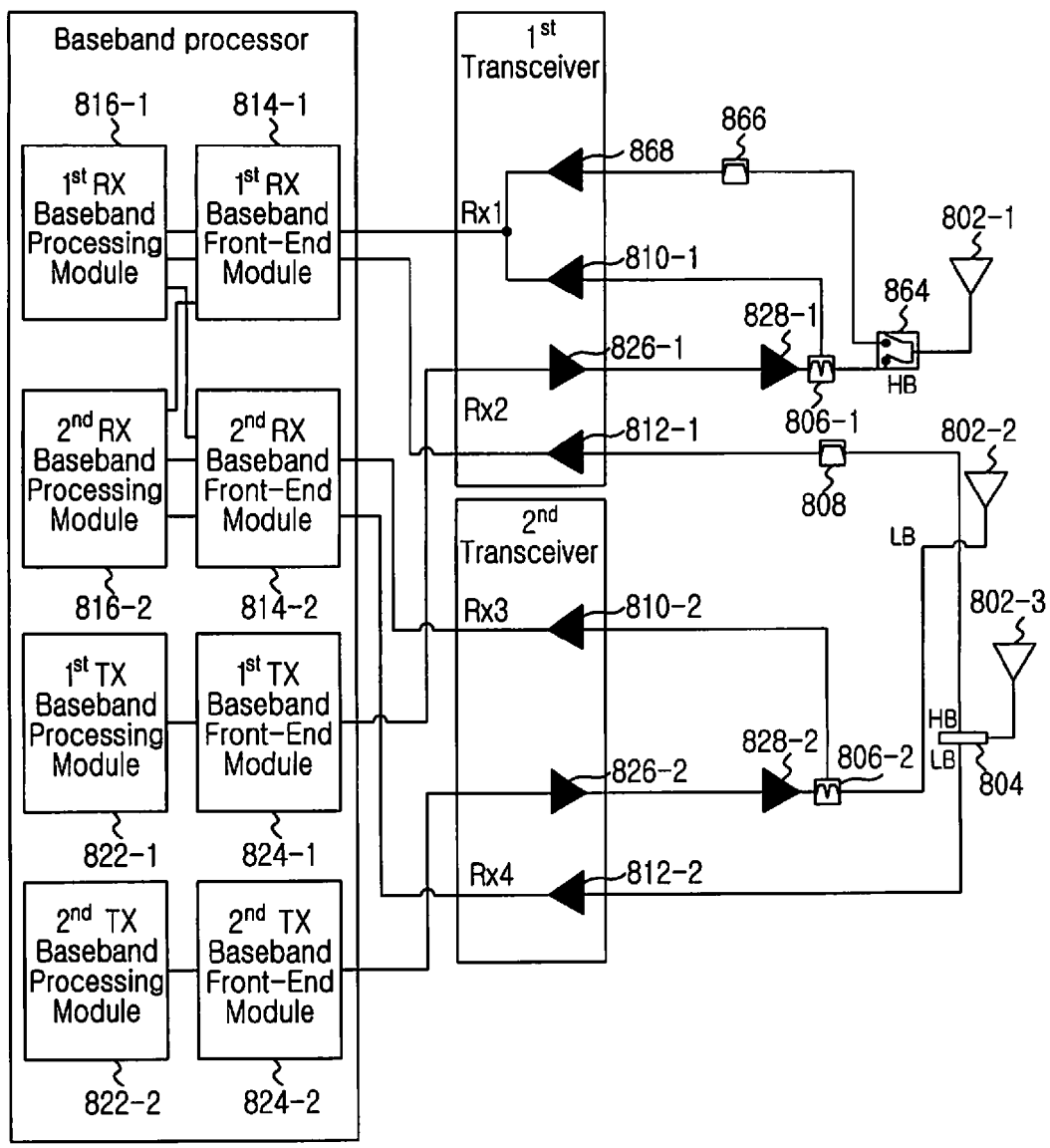
FIG. 8 illustrates an electronic device for a wireless communication according to an embodiment of the present disclosure.

FIG. 8 illustrates an electronic device for a wireless communication according to an embodiment of the present disclosure. In FIG. 8, some of antennas for a communication with a BS may be additionally utilized.

Referring to FIG. 8, the electronic device includes a first antenna 802-1, a second antenna 802-2, and a third antenna 802-3. The first antenna 802-1 is an antenna capable of receiving a first signal (e.g., a high-band signal). The second antenna 802-2 is an antenna capable of receiving a second signal (e.g., a low-band signal). The third antenna 802-3 is an antenna capable of receiving both the first signal and the second signal. The third antenna 802-3 is connected with a diplexer 804. The diplexer 804 separates a TX signal into the first signal and the second signal, and outputs the first signal towards a first transceiver and the second signal towards a second transceiver.

The first transceiver and the second transceiver convert a provided RF signal to a baseband signal. Although only amplifiers of the first transceiver and the second transceiver are shown in FIG. 8, the first transceiver and the second transceiver may further include a filter, an oscillator, a mixer, an ADC, and the like.

The first signal received through the first antenna 802-1 is provided to an amplifier 810-1 in the first transceiver via a first duplexer 806-1. The first duplexer 806-1 allows bidirectional communication over a single path for a TX signal and an RX signal. The first duplexer 806-1 provides a signal received via the first antenna 802-1 to the amplifier 810-1, and provides a TX signal provided from the first transceiver to the first antenna 802-1. A signal amplified by the amplifier 810-1 is provided to a first RX baseband front-end module 814-1 in a baseband processor. The second signal received through the second antenna 802-2 is provided to an amplifier 810-2 in the second transceiver via a second duplexer 806-2. A signal amplified by the amplifier 810-2 is provided to a second RX baseband front-end module 814-2 in the baseband processor.

The first signal output from the diplexer 804 is provided to an amplifier 812-1 of the first transceiver via a band-pass filter 808. A signal amplified by the amplifier 812-1 is provided to the first RX baseband front-end module 814-1 in the baseband processor. Thereafter, the first RX baseband front-end module 814-1 provides a signal to a first RX baseband processing module 816-1. The second signal output from the diplexer 804 is provided to an amplifier 812-2 in the second transceiver. A signal amplified by the amplifier 812-2 is provided to the second RX baseband front-end module 814-2 in the baseband processor. Thereafter, the second RX baseband front-end module 814-2 provides a signal to a second RX baseband processing module 816-2.

The baseband processor includes a first TX baseband processing module 822-1 and a first TX baseband front-end module 824-1 to process a TX signal of the high band, and includes a second TX baseband processing module 822-2 and a second TX baseband front-end module 824-2 to process a signal of the low band. The first TX baseband processing module 822-1 provides a baseband signal to be transmitted through the high band to the first TX baseband front-end module 824-1. The first TX baseband processing module 822-1 and the first TX baseband front-end module 824-1 may be separate modules in a modem chip, or integrated circuit, or may be one integrated module. The first TX baseband front-end module 824-1 provides a TX signal to an amplifier 826-1 in the first transceiver. A signal amplified in the amplifier 826-1 is transmitted through the first antenna 802-1 via an amplifier 828-1 and the first duplexer 806-1. The second TX baseband processing module 822-2 provides the second TX baseband front-end module 824-2 with a baseband signal to be transmitted through the low band. The second TX baseband processing module 822-2 and the second TX baseband front-end module 824-2 may be separate modules in a modem chip or integrated circuit, or may be one integrated module. The second TX baseband front-end module 824-2 provides a TX signal to an amplifier 826-2 in the second transceiver. A signal amplified in the amplifier 826-2 is transmitted through the second antenna 802-2 via an amplifier 828-2 and the second duplexer 806-2. In FIG. 8, the TX signal provided to the first transceiver is amplified by the two amplifiers 826-1 and 828-1, and the two amplifiers 826-1 and 828-1 may amplify signals of different bands. For example, the amplifier 826-1 of a first stage may amplify an intermediary band of the TX signal, and the amplifier 828-1 of a next stage may amplify a low band of the TX signal.

The baseband process of FIG. 8 includes the first RX baseband processing module 816-1, the second RX baseband processing module 816-2, the first TX baseband processing module 822-1, and the second TX baseband processing module 822-2. In this case, the first RX baseband processing module 816-1, the second RX baseband processing module 816-2, the first TX baseband processing module 822-1, and the second TX baseband processing module 822-2 may be included in at least one modem chip or integrated circuit. For example, the first RX baseband processing module 816-1, the second RX baseband processing module 816-2, the first TX baseband processing module 822-1, and the second TX baseband processing module 822-2 may be included in one modem chip or integrated circuit, or may be included separately in a plurality of modem chips.

According to an embodiment of the present disclosure, one of the first antenna 802-1 and the second antenna 802-2 may be used as an additional reception path. In FIG. 8, the first antenna 802-1 is used as an additional reception path. For this, the first antenna 802-1 is connected with the first transceiver via an antenna switch 864.

For example, if the second transceiver is currently processing the second signal, the antenna switch 864 may output the second signal received additionally through the first antenna 802-1 to the first transceiver. In this case, the second signal output from the antenna switch 864 is provided, via a band-pass filter 866 which passes a signal of a frequency in the low band, to the first transceiver to be amplified by an amplifier 868, and thereafter is provided to the first RX baseband front-end module 814-1. The first RX baseband front-end module 814-1 provides the second signal to the second RX baseband processing module 816-2. In addition, the second transceiver provides the second RX baseband front-end module 814-2 with at least one second signal received through at least one of the second antenna 802-2 and the third antenna 802-3, and the second RX baseband front-end module 814-2 provides the at least one second signal to the second RX baseband processing module 816-2. Accordingly, the electronic device further ensures one path for diversity reception. The second RX baseband processing module 816-2 combines the second signal received through at least one of the second antenna 802-2, the third antenna 802-3, and the first antenna 802-1.

Although only one path for signal routing between the first RX baseband front-end module 814-1 and the second RX baseband processing module 816-2 is illustrated in FIG. 8, two or more paths may exist for the signal routing according to the present disclosure. In addition, although only one path for signal routing between the second RX baseband front-end module 814-2 and the first RX baseband processing module 816-1 is illustrated in FIG. 8, two or more paths may exist for the signal routing according to the present disclosure.

Figure 9:
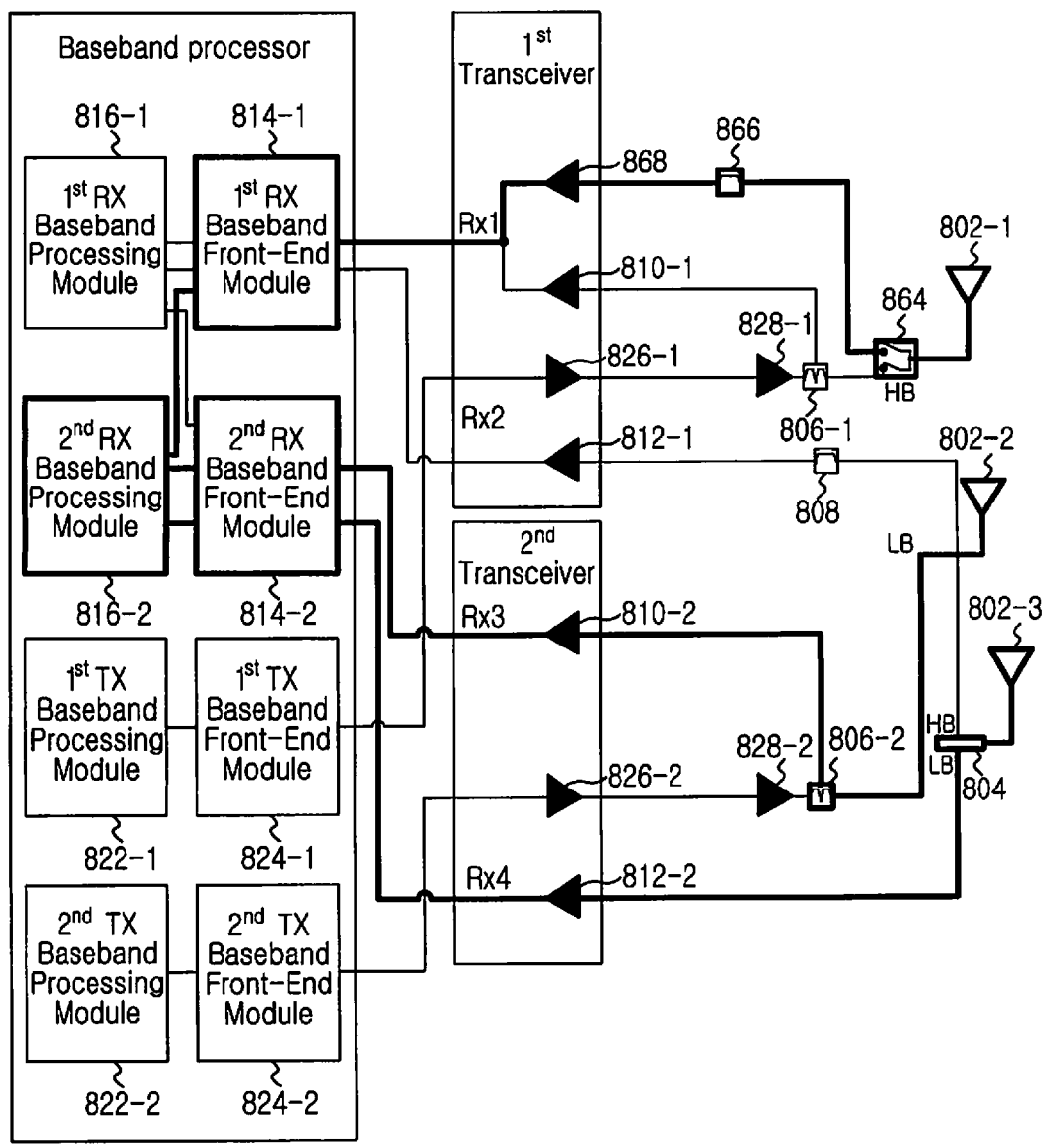
FIG. 9 illustrates a signal processing path of an electronic device according to an embodiment of the present disclosure.

According to FIG. 8, to perform additional diversity reception concerning the second signal, signal processing may be performed as shown in FIG. 9. FIG. 9 illustrates a signal processing path of an electronic device according to an embodiment of the present disclosure. In FIG. 9, a signal processing path and activated blocks are indicated by a bold line.

Referring to FIG. 9, if the second signal (e.g., a low-band signal) is received, the second transceiver for the second signal, the second RX baseband front-end module 814-2 in the baseband processor, and the second RX baseband processing module 816-2 process the second signal. The first transceiver for the first signal, the first RX baseband front-end module 814-1 in the baseband processor, and the first RX baseband processing module 816-1 may not be provided with the first signal. Instead, according to the present disclosure, the first transceiver and first RX baseband front-end module 814-1 in the baseband processor may process the second signal received through a first antenna 802-1. For example, the first transceiver and the first RX baseband front-end module 814-1 receive the second signal through the first antenna 802-1 and provide the second signal to the second RX baseband processing module 816-2.

As described above, a plurality of second signals are provided to the second RX baseband processing module 816-2. The plurality of second signals to be provided to the second RX baseband processing module 816-2 is input to the baseband processor. In this case, an input for the first signal and an input for the second signal are used, and the second signals are collected at the second RX baseband processing module 816-2 through routing in the baseband processor. The input is a medium for delivering a signal from an external element of the baseband processor to an internal element of the baseband processor, and connects the baseband processor to a path for delivering a signal to the baseband processor. The input may be referred to as a pin or a node, and is constructed of an electrically conductive material.

Accordingly, the second RX baseband processing module 816-2 acquires an additional diversity reception gain by combining three second signals received through the first antenna 802-1, a second antenna 802-2, and a third antenna 802-3. According to an embodiment of the present disclosure, the second RX baseband processing module 816-2 may combine all three RX signals or may selectively combine only two signals. For example, the second RX baseband processing module 816-2 may combine only two signals having excellent signal quality. Herein, the signal quality may be determined on the basis of at least one of RX signal strength, SNR, SINR, antenna correlation, RX signal strength, RX signal's arrival delay time, and the like.

Figure 10:
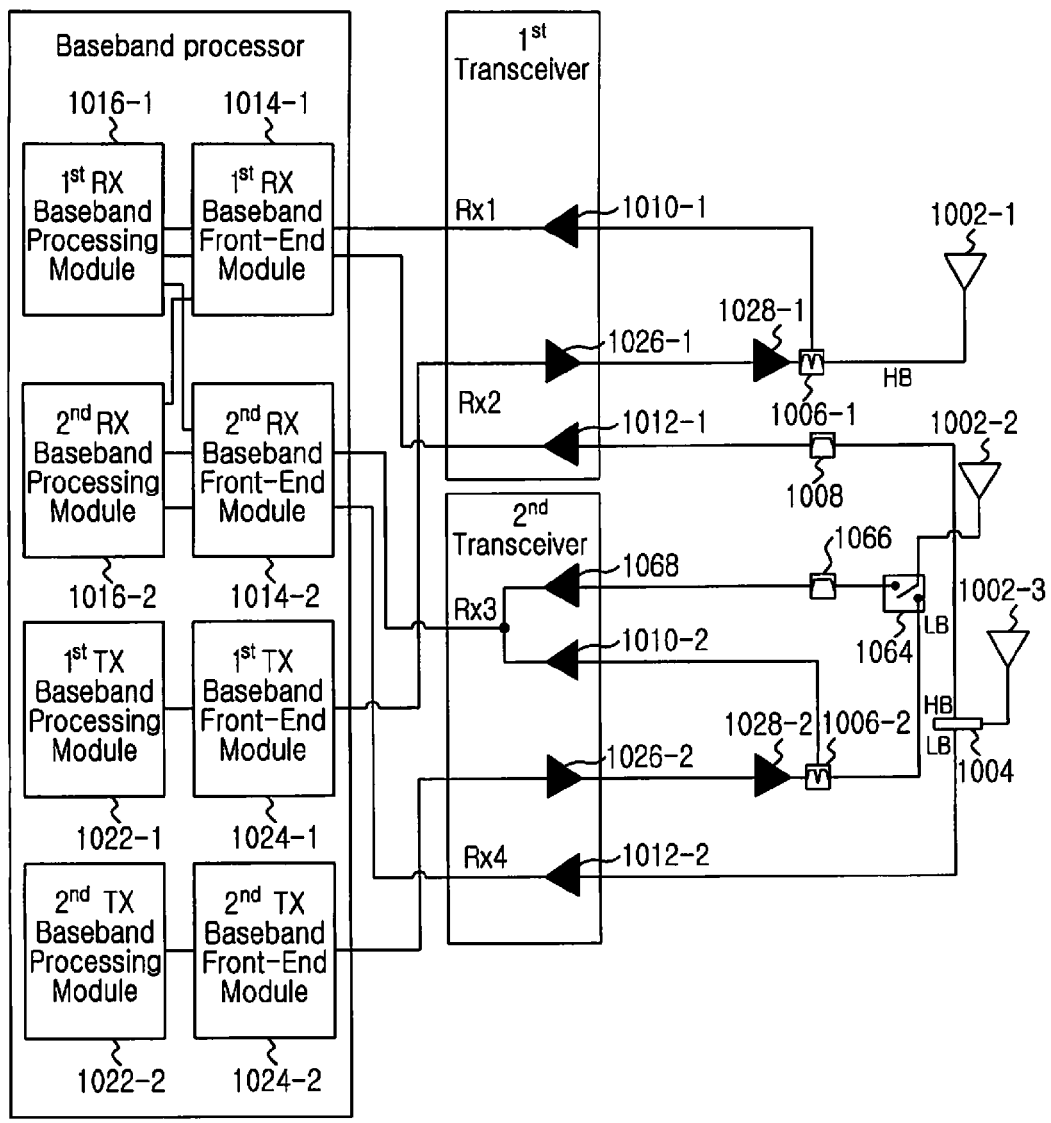
FIG. 10 illustrates an electronic device for a wireless communication according to an embodiment of the present disclosure.

FIG. 10 illustrates a structure of an electronic device for a wireless communication according to an embodiment of the present disclosure. In FIG. 10, some of antennas for a communication with a BS may be utilized.

Referring to FIG. 10, the electronic device includes a first antenna 1002-1, a second antenna 1002-2, and a third antenna 1002-3. The first antenna 1002-1 is an antenna capable of receiving a first signal (e.g., a high-band signal). The second antenna 1002-2 is an antenna capable of receiving a second signal (e.g., a low-band signal). The third antenna 1002-3 is an antenna capable of receiving both of the first signal and the second signal. The third antenna 1002-3 is connected with a diplexer 1004. The diplexer 1004 separates a TX signal into the first signal and the second signal, and outputs the first signal towards a first transceiver and the second signal towards a second transceiver.

The first transceiver and the second transceiver convert a provided RF signal to a baseband signal. Although only amplifiers of the first transceiver and the second transceiver are shown in FIG. 10, the first transceiver and the second transceiver may further include a filter, an oscillator, a mixer, an ADC, and the like.

The first signal received through the first antenna 1002-1 is provided to an amplifier 1010-1 in the first transceiver via a first duplexer 1006-1. The first duplexer 1006-1 allows bidirectional communication over a single path for a TX signal and an RX signal, provides a signal received via the first antenna 1002-1 to the amplifier 1010-1, and provides a TX signal provided from the first transceiver to the first antenna 1002-1. A signal amplified by the amplifier 1010-1 is provided to a first RX baseband front-end module 1014-1 in a baseband processor. The second signal received through the second antenna 1002-2 is provided to an amplifier 1010-2 in the second transceiver via a second duplexer

1006-2. A signal amplified by the amplifier 1010-2 is provided to a second RX baseband front-end module 1014-2 in the baseband processor.

The first signal output from the diplexer 1004 is provided to an amplifier 1012-1 of the first transceiver via a band-pass filter 1008. A signal amplified by the amplifier 1012-1 is provided to the first RX baseband front-end module 1014-1 in the baseband processor. Thereafter, the first RX front-end module 1014-1 provides a signal to a first RX baseband processing module 1016-1. The second signal output from the diplexer 1004 is provided to an amplifier 1012-2 in the second transceiver. A signal amplified by the amplifier 1012-2 is provided to the second RX baseband front-end module 1014-2 in the baseband processor. Thereafter, the second RX front-end module 1014-2 provides a signal to a second RX baseband processing module 1016-2.

The baseband processor includes a first TX baseband processing module 1022-1 and a first TX baseband front-end module 1024-1 to process a TX signal of the high band, and includes a second TX baseband processing module 1022-2 and a second TX baseband front-end module 1024-2 to process a signal of the low band. The first TX baseband processing module 1022-1 provides a baseband signal to be transmitted through the high band to the first TX baseband front-end module 1024-1. The first TX baseband processing module 1022-1 and the first TX baseband front-end module 1024-1 may be separate modules in a modem chip or integrated circuit, or may be one integrated module. The first TX baseband front-end module 1024-1 provides a TX signal to an amplifier 1026-1 in the first transceiver. A signal amplified in the amplifier 1026-1 is transmitted through the first antenna 1002-1 via an amplifier 1028-1 and the first duplexer 1006-1. The second TX baseband processing module 1022-2 provides the second TX baseband front-end module 1024-2 with a baseband signal to be transmitted through the low band. The second TX baseband processing module 1022-2 and the second TX baseband front-end module 1024-2 may be separate modules in a modem chip, or may be one integrated module. The second TX baseband front-end module 1024-2 provides a TX signal to an amplifier 1026-2 in the second transceiver. A signal amplified in the amplifier 1026-2 is transmitted through the second antenna 1002-2 via an amplifier 1028-2 and the second duplexer 1006-2. In FIG. 10, the TX signal provided to the first transceiver is amplified by the two amplifiers 1026-1 and 1028-1, and the two amplifiers 1026-1 and 1028-1 may amplify signals of different bands. For example, the amplifier 1026-1 of a first stage may amplify an intermediary band of the TX signal, and the amplifier 1028-1 of a next stage may amplify a low band of the TX signal.

The baseband process of FIG. 10 may include the first RX baseband processing module 1016-1, the second RX baseband processing module 1016-2, the first TX baseband processing module 1022-1, and the second TX baseband processing module 1022-2. In this case, the first RX baseband processing module 1016-1, the second RX baseband processing module 1016-2, the first TX baseband processing module 1022-1, and the second TX baseband processing module 1022-2 may be included in at least one modem chip or integrated circuit. For example, the first RX baseband processing module 1016-1, the second RX baseband processing module 1016-2, the first TX baseband processing module 1022-1, and the second TX baseband processing module 1022-2 may be included in one modem chip or integrated circuit, or may be included separately in a plurality of modem.

According to an embodiment of the present disclosure, one of the first antenna 1002-1 and the second antenna 1002-2 may be used as an additional reception path. In FIG. 10, the second antenna 1002-2 may be used as an additional reception path. For this, the second antenna 1002-2 is connected with the second transceiver via an antenna switch 1064.

For example, if the first transceiver is currently processing the first signal, the antenna switch 1064 may output the first signal received through the second antenna 1002-2 to the second transceiver. In this case, the first signal output from the antenna switch 1064 is provided via a band-pass filter 1066, which passes a signal of a frequency in the low band, to the second transceiver to be amplified by an amplifier 1068, and thereafter is provided to the second RX baseband front-end module 1014-2. The second RX baseband front-end module 1014-2 provides the first signal to the first RX baseband processing module 1016-1. In addition, the first transceiver provides the first RX baseband front-end module 1014-1 with at least one first signal received through at least one of the first antenna 1002-1 and the third antenna 1002-3, and the first RX baseband front-end module 1014-1 provides the at least one first signal to the first RX baseband processing module 1016-1. Accordingly, the electronic device further ensures one path for diversity reception. The first RX baseband processing module 1016-1 combines the first signal received through at least one of the first antenna 1002-1, the third antenna 1002-3, and the second antenna 1002-2 to perform diversity reception.

Although only one path for signal routing between the first RX baseband front-end module 1014-1 and the second RX baseband processing module 1016-2 is illustrated in FIG. 10, two or more paths may exist for the signal routing according to the present disclosure. In addition, although only one path for signal routing between the second RX baseband front-end module 1014-2 and the first RX baseband processing module 1016-1 is illustrated in FIG. 10, two or more paths may exist for the signal routing according to the present disclosure.

Figure 11:
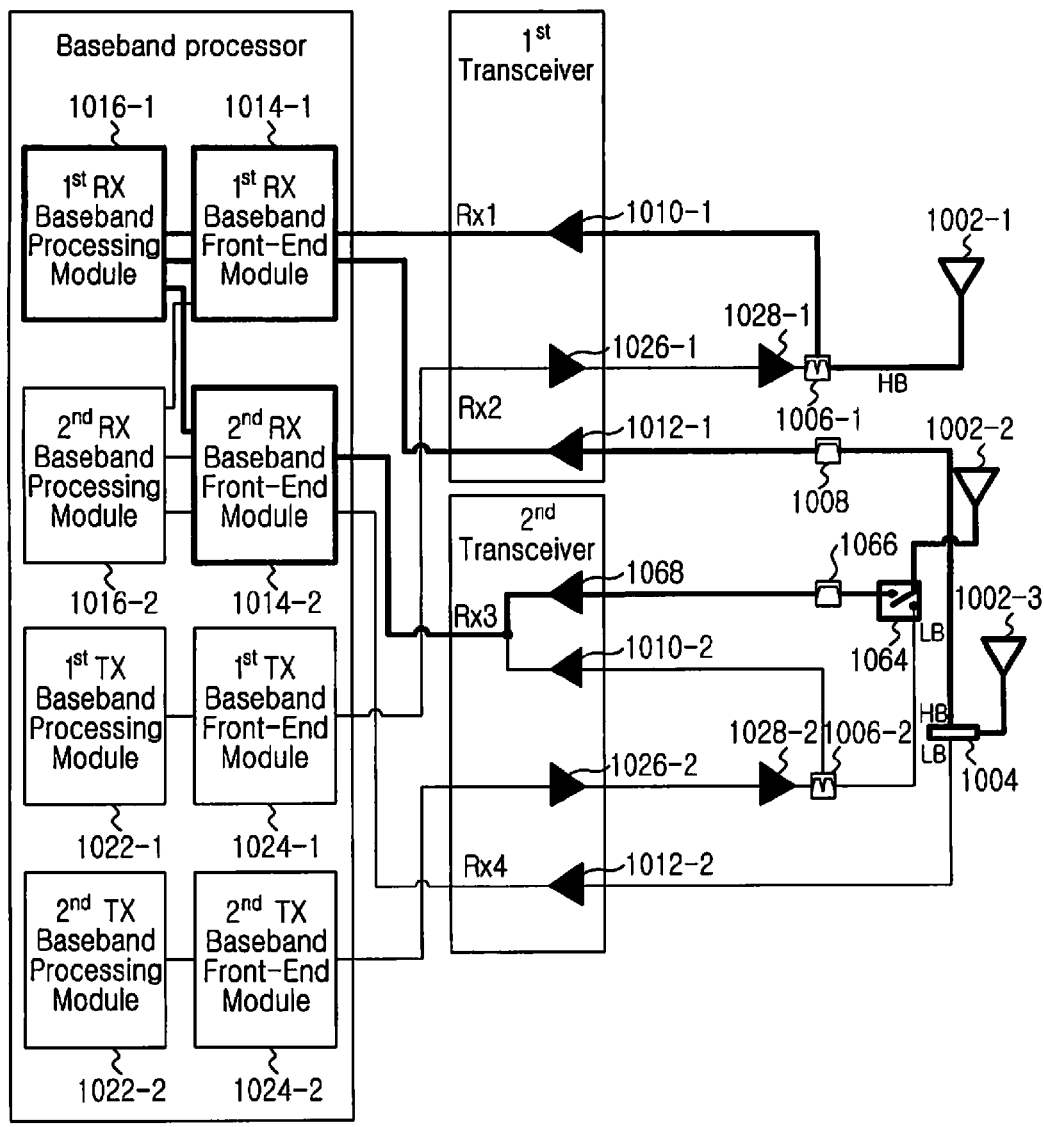
FIG. 11 illustrates a signal processing path of an electronic device according to an embodiment of the present disclosure.

According to FIG. 10, for additional diversity reception concerning the first signal, signal processing may be performed as shown in FIG. 11. FIG. 11 illustrates a signal processing path of an electronic device according to an embodiment of the present disclosure. In FIG. 11, a signal processing path and activated blocks are indicated by a bold line.

Referring to FIG. 11, if the first signal (e.g., a high-band signal) is received, the first transceiver for the first signal, the first RX baseband front-end module 1014-1 in the baseband processor, and the first RX baseband processing module 1016-1 process the first signal. In addition, the second transceiver for the second signal, the second RX baseband front-end module 1014-2 in the baseband processor, and the second RX baseband processing module 1016-2 may not be provided with the second signal. Instead, according to the present disclosure, the second transceiver and second RX baseband front-end module 1014-2 in the baseband processor may process the first signal received through the second antenna 1002-2. For example, the second transceiver and the second RX baseband front-end module 1014-2 may process the first signal received through the second antenna 1002-2 and may provide the first signal to the first RX baseband processing module 1016-1.

As described above, a plurality of first signals are provided to the first RX baseband processing module 1016-1. The plurality of first signals to be provided to the first RX baseband processing module 1016-1 is input to the baseband processor. In this case, an input for the second signal and an input for the first signal are used, and the first signals are collected at the first RX baseband processing module 1016-1 through routing in the baseband processor. The input is a medium for delivering a signal from an external element of the baseband processor to an internal element of the baseband processor, and connects the baseband processor to a path for delivering a signal to the baseband processor. The input may be referred to as a pin or a node, and is constructed of an electrically conductive material.

Accordingly, the first RX baseband processing module 1016-1 acquires a diversity reception gain by combining three first signals received through the first antenna 1002-1, the second antenna 1002-2, and the third antenna 1002-3. According to an embodiment of the present disclosure, the first RX baseband processing module 1016-1 combines the three RX signals or may selectively combine only two signals. For example, the first RX baseband processing module 1016-1 may combine only two signals having excellent signal quality. Herein, the signal quality may be determined on the basis of at least one of RX signal strength, SNR, SINR, antenna correlation, RX signal strength, RX signal's arrival delay time, and the like.

Figure 12:
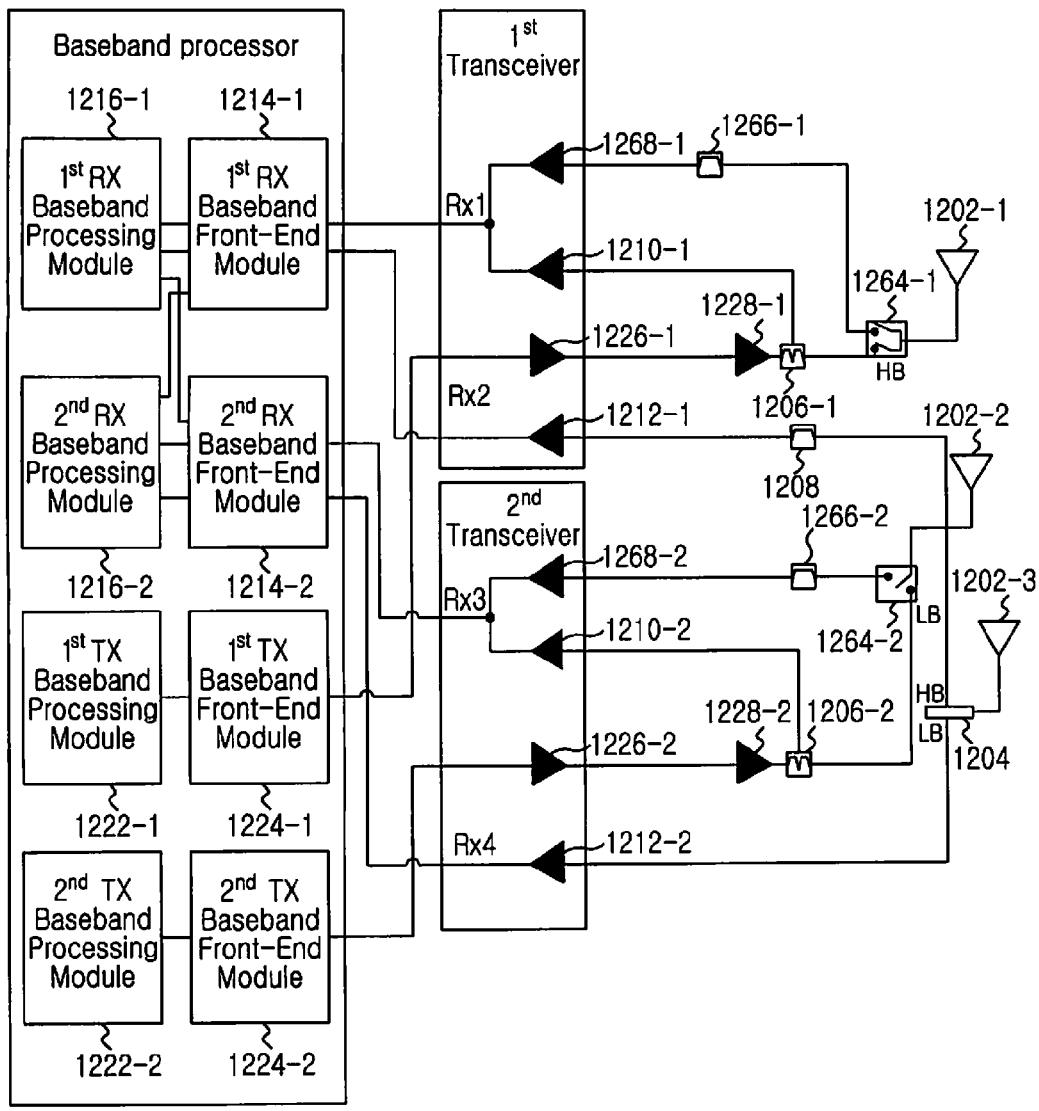
FIG. 12 illustrates an electronic device for a wireless communication according to an embodiment of the present disclosure.

FIG. 12 illustrates an electronic device for a wireless communication according to an embodiment of the present disclosure. In FIG. 12, some of the antennas for communicating with a BS may be utilized.

Referring to FIG. 12, the electronic device includes a first antenna 1202-1, a second antenna 1202-2, and a third antenna 1202-3. The first antenna 1202-1 is an antenna capable of receiving a first signal (e.g., a high-band signal). The second antenna 1202-2 is an antenna capable of receiving a second signal (e.g., a low-band signal). The third antenna 1202-3 is an antenna capable of receiving both the first signal and the second signal. The third antenna 1202-3 is connected to a diplexer 1204. The diplexer 1204 separates a TX signal into the first signal and the second signal, and outputs the first signal towards a first transceiver and the second signal towards a second transceiver.

The first transceiver and the second transceiver convert a provided RF signal to a baseband signal. Although only amplifiers of the first transceiver and the second transceiver are shown in FIG. 12, the first transceiver and the second transceiver may further include a filter, an oscillator, a mixer, an ADC, and the like.

The first signal received through the first antenna 1202-1 is provided to an amplifier 1210-1 in the first transceiver via a first duplexer 1206-1. The first duplexer 1206-1 allows bidirectional communication over a single path for a TX signal and an RX signal, provides a signal received via the first antenna 1202-1 to the amplifier 1210-1, and provides a TX signal provided from the first transceiver to the first antenna 1202-1. A signal amplified by the amplifier 1210-1 is provided to a first RX baseband front-end module 1214-1 in a baseband processor. The second signal received through the second antenna 1202-2 is provided to an amplifier 1210-2 in the second transceiver via a second duplexer 1206-2. A signal amplified by the amplifier 1210-2 is provided to a second RX baseband front-end module 1214-2 in the baseband processor.

The first signal output from the diplexer 1204 is provided to an amplifier 1212-1 of the first transceiver via a band-pass filter 1208. A signal amplified by the amplifier 1212-1 is provided to the first RX baseband front-end module 1214-1 in the baseband processor. Thereafter, the first RX front-end module 1214-1 provides a signal to a first RX baseband processing module 1216-1. The second signal output from the diplexer 1204 is provided to an amplifier 1212-2 in the second transceiver. A signal amplified by the amplifier 1212-2 is provided to the second RX baseband front-end module 1214-2 in the baseband processor. Thereafter, the second RX front-end module 1214-2 provides a signal to a second RX baseband processing module 1216-2.

The baseband processor includes a first TX baseband processing module 1222-1 and a first TX baseband front-end module 1224-1 to process a TX signal of the high band, and include a second TX baseband processing module 1222-2 and a second TX baseband front-end module 1224-2 to process a signal of the low band. The first TX baseband processing module 1222-1 provides a baseband signal to be transmitted through the high band to the first TX baseband front-end module 1224-1. The first TX baseband front-end module 1224-1 provides a TX signal to an amplifier 1226-1 in the first transceiver. A signal amplified in the amplifier 1226-1 is transmitted through the first antenna 1202-1 via an amplifier 1228-1 and the first duplexer 1206-1. The second TX baseband processing module 1222-2 provides the second TX baseband front-end module 1224-2 with a baseband signal to be transmitted through the low band. The second TX baseband front-end module 1224-2 provides a TX signal to an amplifier 1226-2 in the second transceiver. A signal amplified in the amplifier 1226-2 is transmitted through the second antenna 1202-2 via an amplifier 1228-2 and the second duplexer 1206-2. In FIG. 12, the TX signal provided to the first transceiver is amplified by the two amplifiers 1226-1 and 1228-1, and the two amplifiers 1226-1 and 1228-1 may amplify signals of different bands. For example, the amplifier 1226-1 of a first stage may amplify an intermediary band of the TX signal, and the amplifier 1228-1 of a next stage may amplify a low band of the TX signal.

The baseband process of FIG. 12 includes the first RX baseband processing module 1216-1, the second RX baseband processing module 1216-2, the first TX baseband processing module 1222-1, and the second TX baseband processing module 1222-2. In this case, the first RX baseband processing module 1216-1, the second RX baseband processing module 1216-2, the first TX baseband processing module 1222-1, and the second TX baseband processing module 1222-2 may be included in at least one modem chip or integrated circuit. For example, the first RX baseband processing module 1216-1, the second RX baseband processing module 1216-2, the first TX baseband processing module 1222-1, and the second TX baseband processing module 1222-2 may be included in one modem chip, or may be included separately in a plurality of modem chips.

If diversity reception is performed using an unused RX module according to the embodiment of the present disclosure, one of the first antenna 1202-1 and the second antenna 1202-2 may be used as an additional reception path. The example of FIG. 12 shows a structure in which one of the first antenna 1201-1 and the second antenna 1202-2 may be selectively used as an additional reception path. For this, the first antenna 1202-1 may be connected with the first transceiver via a first antenna switch 1264-1, and the second antenna 1202-2 may be connected with the second transceiver via a second antenna switch 1264-2.

For example, if the second transceiver is currently processing the second signal, the first antenna switch 1264-1 may be used to receive the second signal through the first antenna 1202-1 and to output it to the first transceiver. In this case, the second signal output from the first antenna switch 1264-1 is provided via a band-pass filter 1266-1, which passes a signal of a frequency is the low band, is provided to the first transceiver so as to be amplified by an amplifier

1268-1, and thereafter is provided to the first RX baseband front-end module 1214-1. The first RX baseband front-end module 1214-1 provides the second signal to the second RX baseband processing module 1216-2. In addition, the second transceiver provides the second RX baseband front-end module 1214-2 with at least one second signal received through at least one of the second antenna 1202-2 and the third antenna 1202-3, and the second RX baseband front-end module 1214-2 provides the at least one second signal to the second RX baseband processing module 1216-2. Accordingly, the electronic device further ensures one path for diversity reception. The second RX baseband processing module 1216-2 combines the second signal received through at least one of the second antenna 1202-2, the third antenna 1202-3, and the first antenna 1202-1.

In another example, if the first transceiver is currently processing the first signal, the second antenna switch 1264-2 may output the first signal received through the second antenna 1202-2 to the second transceiver. In this case, the first signal output from the second antenna switch 1264-2 is provided via a band-pass filter 1266-2, which passes a signal of a frequency in the low band, to the second transceiver so as to be amplified by an amplifier 1268-2, and thereafter is provided to the second RX baseband front-end module 1214-2. The second RX baseband front-end module 1214-2 provides the first signal to the first RX baseband processing module 1216-1. In addition, the first transceiver may provide the first RX baseband front-end module 1214-1 with at least one first signal received through at least one of the first antenna 1202-1 and the third antenna 1202-3, and the first RX baseband front-end module 1214-1 provides the at least one first signal to the first RX baseband processing module 1216-1. Accordingly, the electronic device further ensures one path for diversity reception. The first RX baseband processing module 1216-1 combines the first signal received through at least one of the first antenna 1202-1, the third antenna 1202-3, and the second antenna 1202-2.

Although only one path for signal routing between the first RX baseband front-end module 1214-1 and the second RX baseband processing module 1216-2 is illustrated in the example of FIG. 12, two or more paths may exist for the signal routing according to the present disclosure. In addition, although only one path for signal routing between the second RX baseband front-end module 1214-2 and the first RX baseband processing module 1216-1 is illustrated in the example of FIG. 12, two or more paths may exist for the signal routing according to the embodiment of the present disclosure.

Figure 13:
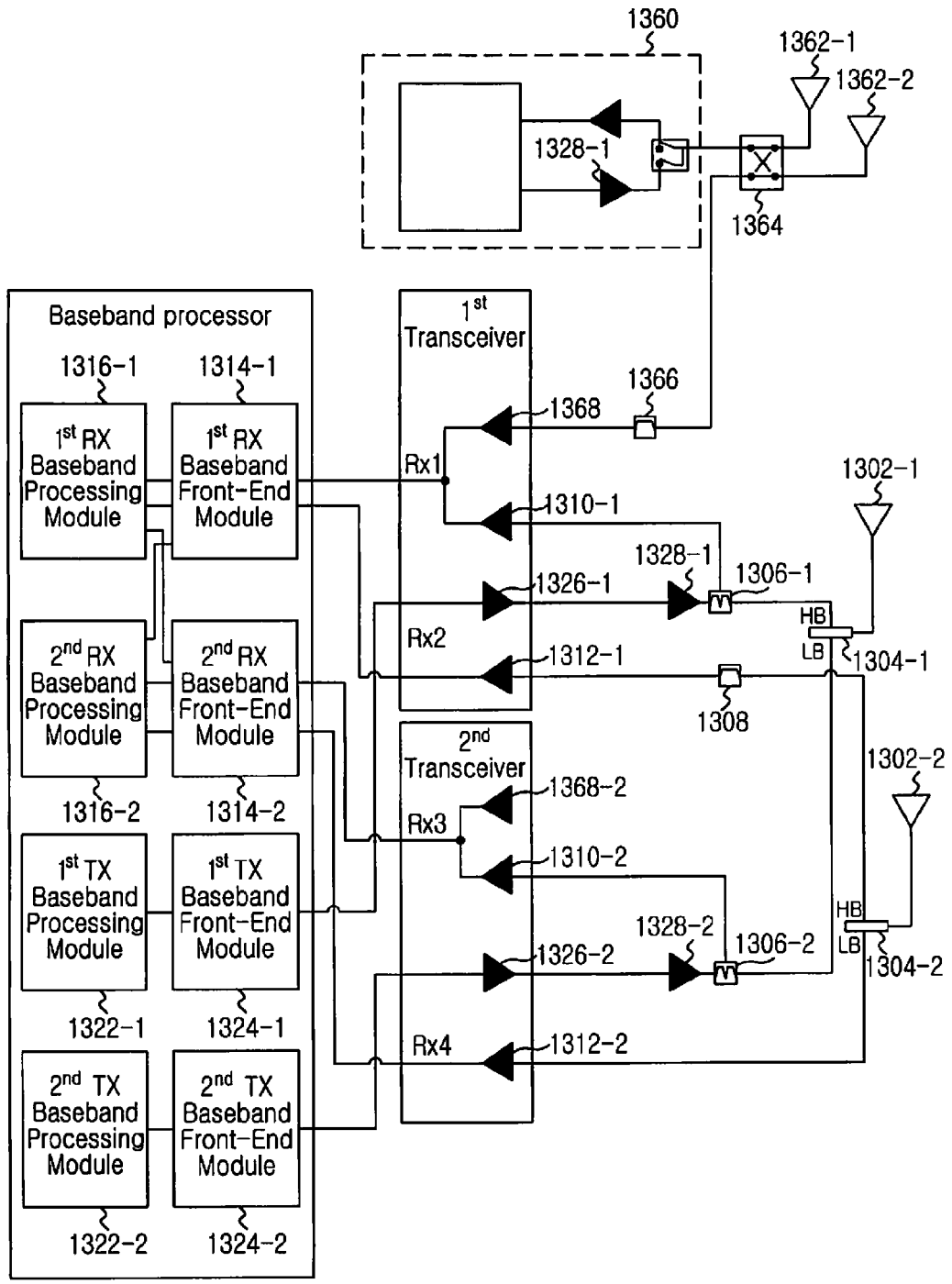
FIG. 13 illustrates an electronic device for a wireless communication according to an embodiment of the present disclosure.

FIG. 13 illustrates an electronic device for a wireless communication according to an embodiment of the present disclosure. In FIG. 13, a plurality of additional antennas may be utilized for a different communication means other than communicating with a BS.

Referring to FIG. 13, the electronic device includes a first antenna 1302-1 and a second antenna 1302-2. The first antenna 1302-1 is connected with a first diplexer 1304-1. The first diplexer 1304-1 separates a TX signal into a first signal (e.g., a high-band signal) and a second signal (e.g., a low-band signal), and outputs the first signal towards a first transceiver and the second signal towards a second transceiver. The second antenna 1302-2 is connected with a second diplexer 1304-2. The second diplexer 1304-2 separates a TX signal into a first signal and a second signal, and outputs the first signal towards the first transceiver and the second signal towards the second transceiver.

The first transceiver and the second transceiver convert a provided RF signal to a baseband signal. Although only amplifiers of the first transceiver and the second transceiver are shown in FIG. 13, the first transceiver and the second transceiver may further include a filter, an oscillator, a mixer, an ADC, and the like.

The first signal output from the first diplexer 1304-1 is provided to an amplifier 1310-1 in the first transceiver via a first duplexer 1306-1. The first duplexer 1306-1 allows bidirectional communication over a single path for a TX signal and an RX signal. The first duplexer 1306-1 provides a signal received via the first antenna 1302-1 to the amplifier 1310-1, and provides a TX signal provided from the first transceiver to the first antenna 1302-1. A signal amplified by the amplifier 1310-1 is provided to a first RX baseband front-end module 1314-1 in a baseband processor. The first signal output from the second diplexer 1304-2 is provided to an amplifier 1312-1 of the first transceiver via a band-pass filter 1308. A signal amplified by the amplifier 1312-1 is provided to the first RX baseband front-end module 1314-1 in the baseband processor. Thereafter, the first RX front-end module 1314-1 provides a signal to a first RX baseband processing module 1316-1.

The second signal output from the first diplexer 1304-1 is provided to an amplifier 1310-2 in the second transceiver via a second duplexer 1306-2. A signal amplified by the amplifier 1310-2 is provided to a second RX baseband front-end module 1314-2 in the baseband processor. The second signal output from the second diplexer 1304-2 is provided to an amplifier 1312-2 of the second transceiver. A signal amplified by the amplifier 1312-2 is provided to the second RX baseband front-end module 1314-2 in the baseband processor. Thereafter, the second RX baseband front-end module 1314-2 provides a signal to a second RX baseband processing module 1316-2.

The baseband processor includes a first TX baseband processing module 1322-1 and a first TX baseband front-end module 1324-1 to process a TX signal of the high band, and includes a second TX baseband processing module 1322-2 and a second TX baseband front-end module 1324-2 to process a signal of the low band. The first TX baseband processing module 1322-1 provides a baseband signal to be transmitted through the high band to the first TX baseband front-end module 1324-1. The first TX baseband front-end module 1324-1 provides a TX signal to an amplifier 1326-1 in the first transceiver. A signal amplified in the amplifier 1326-1 is transmitted through the first antenna 1302-1 via the first duplexer 1306-1, and the first diplexer 1304-1. The second TX baseband processing module 1322-2 provides the second TX baseband front-end module 1324-2 with a baseband signal to be transmitted through the low band. The second TX baseband front-end module 1324-2 provides a TX signal to an amplifier 1326-2 in the second transceiver. A signal amplified in the amplifier 1326-2 is transmitted through the first antenna 1302-1 via an amplifier 1328-2, the second duplexer 1306-2, and the first diplexer 1304-1. In FIG. 13, the TX signal provided to the first transceiver is amplified by the two amplifiers 1326-1 and 1328-1, and the two amplifiers 1326-1 and 1328-1 may amplify signals of different bands. For example, the amplifier 1326-1 of a first stage may amplify an intermediary band of the TX signal, and the amplifier 1328-1 of a next stage may amplify a low band of the TX signal.

A first additional antenna 1362-1 and a second additional antenna 1362-2 are TX/RX antennas that may be connected with a different communication unit 1360 other than the first transceiver, the second transceiver, and the baseband processor. Although two different additional antennas 1362-1 and 1362-2 are illustrated in case of FIG. 13, three or more additional antennas may be included according to another embodiment of the present disclosure. For example, the different communication unit may include one of a Bluetooth module, a Wi-Fi module, a GPS module, a DMB module, and an NFC module. Although one different communication unit 1360 is illustrated in case of FIG. 13, a plurality of other communication units may be included. In this case, the first additional antenna 1362-1 and the second additional antenna 1362-2 may be connected to respective different communication units. Although not shown in FIG. 13, the different communication unit 1360 may include a third transceiver.

The baseband process of FIG. 13 includes the first RX baseband processing module 1316-1, the second RX baseband processing module 1316-2, the first TX baseband processing module 1322-1, and the second TX baseband processing module 1322-2. In this case, the first RX baseband processing module 1316-1, the second RX baseband processing module 1316-2, the first TX baseband processing module 1322-1, and the second TX baseband processing module 1322-2 may be included in at least one modem chip or integrated circuit. For example, all of the first RX baseband processing module 1316-1, the second RX baseband processing module 1316-2, the first TX baseband processing module 1322-1, and the second TX baseband processing module 1322-2 may be included in one modem chip, or may be included separately in a plurality of modem chips.

If diversity reception is performed by using an unused RX module according to an embodiment of the present disclosure, one of the first additional antenna 1362-1 and the second additional antenna 1362-2 is used as an additional reception path. For this, one of the first additional antenna 1362-1 and the second additional antenna 1362-2 is connected with the first transceiver through an antenna switch 1364.

For example, if the second transceiver is currently processing the second signal, the antenna switch 1364 may be used to receive the second signal through one of the first additional antenna 1362-1 and the second additional antenna 1362-2 and to output it to the first transceiver. In this case, a signal output from the antenna switch 1364 is provided to the first transceiver via a band-pass filter 1366 which passes a signal of a frequency in the low band, is amplified by an amplifier 1368 in the first transceiver, and thereafter is provided to the first RX baseband front-end module 1314-1. The first RX baseband front-end module 1314-1 provides the second signal to the second RX baseband processing module 1316-2. In addition, the second transceiver provides the second RX baseband front-end module 1314-2 with at least one second signal received through at least one of the first antenna 1302-1 and the second antenna 1302-2, and the second RX baseband front-end module 1314-2 provides the at least one second signal to the second RX baseband processing module 1316-2. Accordingly, the electronic device further ensures one path for diversity reception. The second RX baseband processing module 1316-2 combines the second signal received through at least one of the first antenna 1302-1 and the second antenna 1302-2 and the second signal received through one of the first additional antenna 1362-1 and the second additional antenna 1362-2.

Although only one path for signal routing between the first RX baseband front-end module 1314-1 and the second RX baseband processing module 1316-2 is illustrated in FIG. 13, two or more paths may exist for the signal routing according to the present disclosure. In addition, although only one path for signal routing between the second RX baseband front-end module 1314-2 and the first RX baseband processing module 1316-1 is illustrated in the example of FIG. 13, two or more paths may exist for the signal routing according to the embodiment of the present disclosure.

Figure 14:
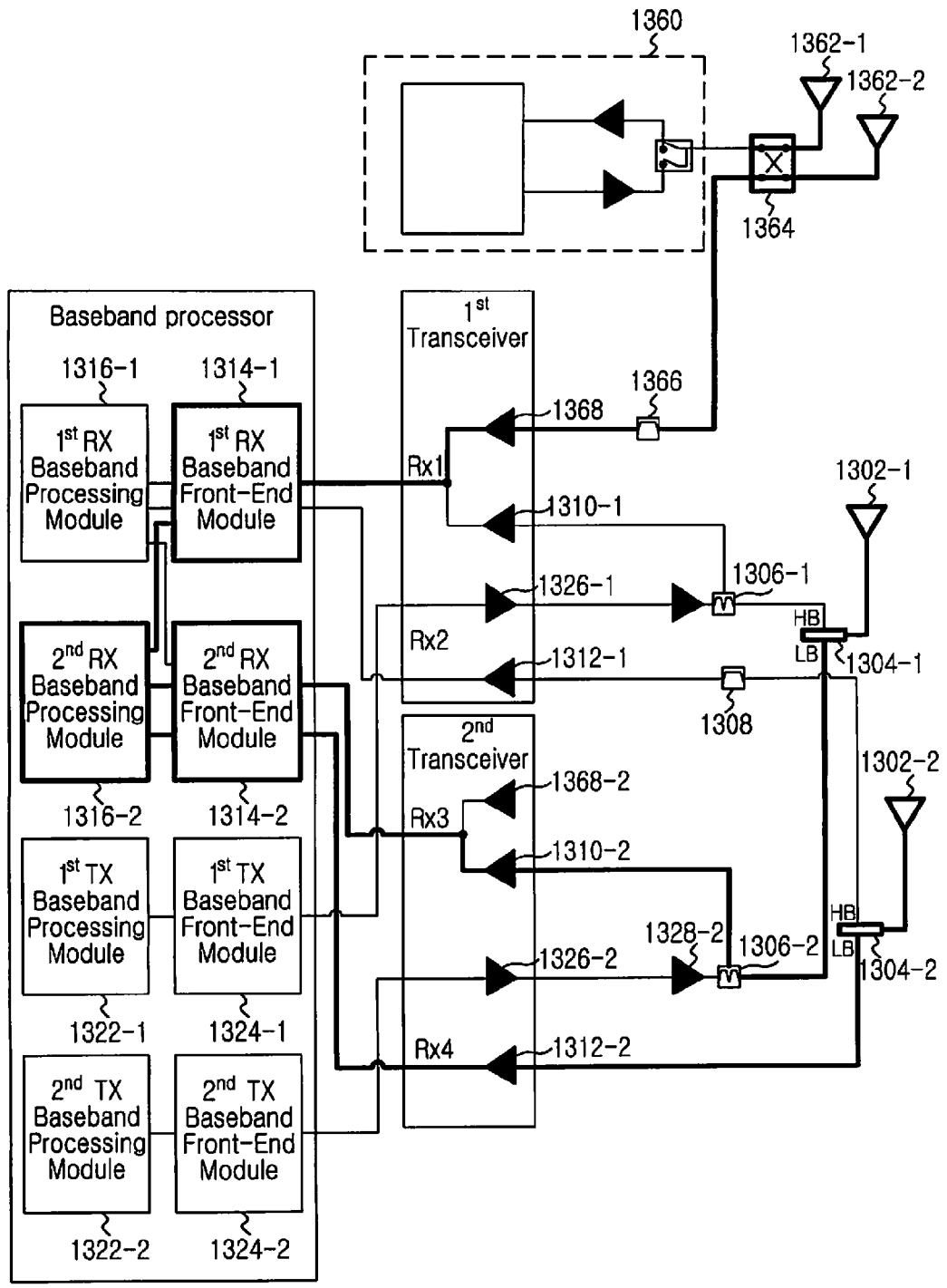
FIG. 14 illustrates a signal processing path of an electronic device according to an embodiment of the present disclosure.

According to FIG. 13, for additional diversity reception concerning the second signal, signal processing may be performed as shown in FIG. 14. FIG. 14 illustrates a signal processing path of an electronic device according to the present disclosure. In FIG. 14, a signal processing path and activated blocks are indicated by a bold line.

Referring to FIG. 14, if the second signal (e.g., a low-band signal) is received, the second transceiver for the second signal, the second RX baseband front-end module 1314-2 in the baseband processor, and the second RX baseband processing module 1316-2 process the second signal. Since the first signal (e.g., a high-band signal) is not received, the first transceiver for the first signal, the first RX baseband front-end module 1314-1 in the baseband processor, and the first RX baseband processing module 1316-1 may not be provided with the first signal. If diversity reception using an unused module is not performed, the first transceiver, the first RX baseband front-end module 1314-1 in the baseband processor, and the first RX baseband processing module 1316-1 may be deactivated.

According to the present disclosure, the first transceiver and first RX baseband front-end module 1314-1 in the baseband processor process the second signal received through one of the first additional antenna 1362-1 and the second additional antenna 1362-2. The first transceiver and the first RX baseband front-end module 1314-1 in the baseband processor may process the second signal received through the first additional antenna 1362-1 and provides the second signal to the second RX baseband processing module 1316-2.

As described above, a plurality of second signals are provided to the second RX baseband processing module 1316-2. The plurality of second signals to be provided to the second RX baseband processing module 1316-2 is input to the baseband processor. In this case, both of an input for the first signal and an input for the second signal are used, and the second signals are collected at the second RX baseband processing module 1316-2 through routing in the baseband processor. The input is a medium for delivering a signal from an external element of the baseband processor to an internal element of the baseband processor, and connects the baseband processor to a path for delivering a signal to the baseband processor. The input may be referred to as a pin or a node, and is constructed of an electrically conductive material.

Accordingly, the second RX baseband processing module 1316-2 acquires a diversity reception gain by combining three second signals, that is, two second signals received through the first antenna 1302-1 and the second antenna 1302-2 and one second signal received through one of the first additional antenna 1362-1 and the second additional antenna 1362-2. According to the present disclosure, the second RX baseband processing module 1316-2 may combine the three RX signals or may selectively combine only two signals. For example, the second RX baseband processing module 1316-2 may combine only two signals having excellent signal quality. Herein, the signal quality may be determined on the basis of at least one of RX signal strength, SNR, SINK, antenna correlation, RX signal strength, RX signal's arrival delay time, and the like.

Figure 15:
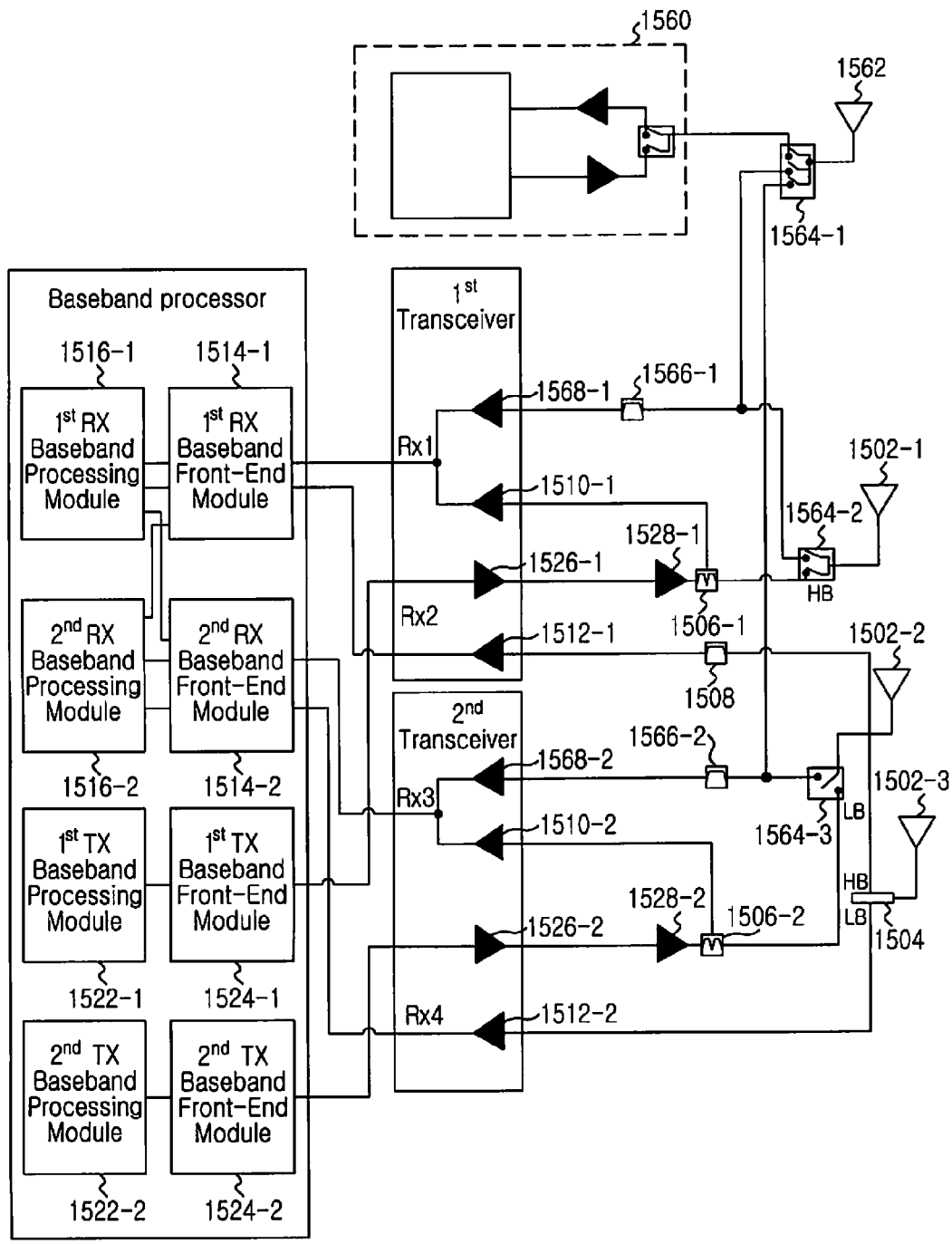
FIG. 15 illustrates an electronic device for a wireless communication according to an embodiment of the present disclosure.

FIG. 15 illustrates an electronic device for a wireless communication according to an embodiment of the present disclosure. In FIG. 15, a plurality of additional antennas may be utilized for some of the antennas for a communication with a BS or a different communication unit other than for communicating with the BS.

Referring to FIG. 15, the electronic device includes a first antenna 1502-1, a second antenna 1502-2, and a third antenna 1502-3. The first antenna 1502-1 is an antenna capable of receiving a first signal (e.g., a high-band signal). The second antenna 1502-2 is an antenna capable of receiving a second signal (e.g., a low-band signal). The third antenna 1502-3 is an antenna capable of receiving both the first signal and the second signal. The third antenna 1502-3 is connected to a diplexer 1504. The diplexer 1504 separates a TX signal into the first signal and the second signal, and outputs the first signal towards a first transceiver and the second signal towards a second transceiver.

The first transceiver and the second transceiver convert a provided RF signal to a baseband signal. Although only amplifiers of the first transceiver and the second transceiver are shown in FIG. 15, the first transceiver and the second transceiver may further include a filter, an oscillator, a mixer, an ADC, and the like.

The first signal received through the first antenna 1502-1 is provided to an amplifier 1510-1 in the first transceiver via a first duplexer 1506-1. The first duplexer 1506-1 allows bidirectional communication over a single path for a TX signal and an RX signal. The first duplexer 1506-1 provides a signal received via the first antenna 1502-1 to the amplifier 1510-1, and provides a TX signal provided from the first transceiver to the first antenna 1502-1. A signal amplified by the amplifier 1510-1 is provided to a first RX baseband front-end module 1514-1 in a baseband processor. The second signal received through the second antenna 1502-2 is provided to an amplifier 1510-2 in the second transceiver via a second duplexer 1506-2. A signal amplified by the amplifier 1510-2 is provided to a second RX baseband front-end module 1514-2 in the baseband processor.

The first signal output from the diplexer 1504 may be provided to an amplifier 1512-1 of the first transceiver via a band-pass filter 1508. A signal amplified by the amplifier 1512-1 is provided to the first RX baseband front-end module 1514-1 in the baseband processor. Thereafter, the first RX front-end module 1514-1 may provide a signal to a first RX baseband processing module 1516-1. The second signal output from the diplexer 1504 may be provided to an amplifier 1512-2 in the second transceiver. A signal amplified by the amplifier 1512-2 is provided to the second RX baseband front-end module 1514-2 in the baseband processor. Thereafter, the second RX front-end module 1514-2 may provide a signal to a second RX baseband processing module 1516-2.

The baseband processor includes a first TX baseband processing module 1522-1 and a first TX baseband front-end module 1524-1 to process a TX signal of the high band, and include a second TX baseband processing module 1522-2 and a second TX baseband front-end module 1524-2 to process a signal of the low band. The first TX baseband processing module 1522-1 provides a baseband signal to be transmitted through the high band to the first TX baseband front-end module 1524-1. The first TX baseband front-end module 1524-1 provides a TX signal to an amplifier 1526-1 in the first transceiver. A signal amplified in the amplifier 1526-1 is transmitted through the first antenna 1502-1 via an amplifier 1528-1 and the first duplexer 1506-1. The second TX baseband processing module 1522-2 provides the second TX baseband front-end module 1524-2 with a baseband signal to be transmitted through the low band. The second TX baseband front-end module 1524-2 provides a TX signal to an amplifier 1526-2 in the second transceiver. A signal amplified in the amplifier 1526-2 is transmitted through the second antenna 1502-2 via an amplifier 1528-2 and the second duplexer 1506-2. In FIG. 15, the TX signal provided to the first transceiver is amplified by the two amplifiers 1526-1 and 1528-1, and the two amplifiers 1526-1 and 1528-1 may amplify signals of different bands. For example, the amplifier 1526-1 of a first stage may amplify an intermediary band of the TX signal, and the amplifier 1528-1 of a next stage may amplify a low band of the TX signal.

An additional antenna 1562 is a TX/RX antenna that may be connected with the first transceiver, the second transceiver, or a different communication unit 1560 through a switch 1564-1. For example, the different communication unit 1560 may include one of a Bluetooth module, a Wi-Fi module, a GPS module, a DMB module, and an NFC module. Although one different communication unit 1560 is illustrated in FIG. 15, a plurality of other communication units maybe included, and thus a plurality of additional antennas maybe included. Although not shown in FIG. 15, the different communication unit 1560 may include a third transceiver.

The baseband process of FIG. 15 includes the first RX baseband processing module 1516-1, the second RX baseband processing module 1516-2, the first TX baseband processing module 1522-1, and the second TX baseband processing module 1522-2. In this case, the first RX baseband processing module 1516-1, the second RX baseband processing module 1516-2, the first TX baseband processing module 1522-1, and the second TX baseband processing module 1522-2 may be included in at least one modem chip or integrated circuit. For example, the first RX baseband processing module 1516-1, the second RX baseband processing module 1516-2, the first TX baseband processing module 1522-1, and the second TX baseband processing module 1522-2 may be included in one modem chip, or may be included separately in a plurality of modem chips.

If a diversity reception is performed using an unused RX module according to an embodiment of the present disclosure, the additional antenna 1562 is used as an additional reception path. For this, the additional antenna 1562 is connected to the first transceiver and the second transceiver through the first antenna switch 1564-1. If the second transceiver is currently processing the second signal, the first antenna switch 1564-1 is used to receive the second signal through the additional antenna 1562 and to output it to the first transceiver. In this case, a signal output from the first antenna switch 1564-1 is provided to the first transceiver via a first band-pass filter 1566-1, which passes a signal of a frequency in the low band, is amplified by an amplifier 1568-1 in the first transceiver, and thereafter is provided to the first RX baseband front-end module 1514-1. The first RX baseband front-end module 1514-1 provides the second signal to the second RX baseband processing module 1516-2. In addition, the second transceiver provides the second RX baseband front-end module 1514-2 with at least one second signal received through at least one of the second antenna 1502-2 and the third antenna 1502-3, and the second RX baseband front-end module 1514-2 provides the at least one second signal to the second RX baseband processing module 1516-2. Accordingly, the electronic device further ensures one path for the diversity reception. The second RX baseband processing module 1516-2 combines the second signal received through at least one of the second antenna 1502-2, the third antenna 1502-3, and the additional antenna 1562.

In addition, if the first transceiver is currently processing the first signal, the first antenna switch 1564-1 is used to receive the signal through the additional antenna 1562 and to output it to the second transceiver. In this case, a signal output from the first antenna switch 1564-1 is provided to the second transceiver via a second band-pass filter 1566-2 which passes a signal of a frequency in the high band. The second RX baseband front-end module 1514-2 provides the first signal to the first RX baseband processing module 1516-1. In addition, the first transceiver provides the first RX baseband front-end module 1514-1 with at least one first signal received through at least one of the first antenna 1502-1 and the third antenna 1502-3, and the first RX baseband front-end module 1514-1 provides the at least one first signal to the first RX baseband processing module 1516-1. Accordingly, the electronic device further ensures one path for diversity reception. The first RX baseband processing module 1516-1 combines the first signal received through at least one of the first antenna 1502-1, the third antenna 1502-3, and the additional antenna 1562.

If diversity reception is performed using an unused RX module according to an embodiment of the present disclosure, one of the first antenna 1502-1 and the second antenna 1502-2 is used as an additional reception path. FIG. 15 shows an apparatus in which one of the first antenna 1501-1 and the second antenna 1502-2 may be selectively used as an additional reception path. For this, the first antenna 1502-1 is connected to the first transceiver via a second antenna switch 1564-2, and the second antenna 1502-2 is connected to the second transceiver via the second antenna switch 1564-2.

For example, if the second transceiver is currently processing the second signal, the second antenna switch 1564-2 is used to receive the second signal through the first antenna 1502-1 and to output it to the first transceiver. In this case, the second signal output from the second antenna switch 1564-2 is provided via the band-pass filter 1566-1, which passes a signal of frequency in the low band, is provided to the first transceiver to be amplified by the amplifier 1568-1 in the first transceiver, and thereafter is provided to the first RX baseband front-end module 1514-1. The first RX baseband front-end module 1514-1 provides the second signal to the second RX baseband processing module 1516-2. In addition, the second transceiver provides the second RX baseband front-end module 1514-2 with at least one second signal received through at least one of the second antenna 1502-2 and the third antenna 1502-3, and the second RX baseband front-end module 1514-2 provides the at least one second signal to the second RX baseband processing module 1516-2. Accordingly, the electronic device further ensures one path for the diversity reception. The second RX baseband processing module 1516-2 combines the second signal received through at least one of the second antenna 1502-2, the third antenna 1502-3, and the first antenna 1502-1.

In another example, if the first transceiver is currently processing the first signal, a third antenna switch 1564-3 outputs the first signal received through the second antenna 1502-2 to the second transceiver. In this case, the first signal output from the third antenna switch 1564-3 is provided via the band-pass filter 1566-2, which passes a signal of a frequency in the low band, to the second transceiver to be amplified by the amplifier 1568-2 in the second transceiver, and thereafter is provided to the second RX baseband front-end module 1514-2. The second RX baseband front-end module 1514-2 provides the first signal to the first RX baseband processing module 1516-1. In addition, the first transceiver provides the first RX baseband front-end module 1514-1 with at least one first signal received through at least one of the first antenna 1502-1 and the third antenna 1502-3, and the first RX baseband front-end module 1514-1 provides the at least one first signal to the first RX baseband processing module 1516-1. Accordingly, the electronic device further ensures one path for diversity reception. The first RX baseband processing module 1516-1 combines the first signal received through at least one of the first antenna 1502-1, the third antenna 1502-3, and the second antenna 1502-2.

Although only one path for signal routing between the first RX baseband front-end module 1514-1 and the second RX baseband processing module 1516-2 is illustrated in FIG. 15, two or more paths may exist for the signal routing according to the present disclosure. In addition, although only one path for signal routing between the second RX baseband front-end module 1514-2 and the first RX baseband processing module 1516-1 is illustrated in FIG. 15, two or more paths may exist for the signal routing according to the present disclosure.

Figure 16:
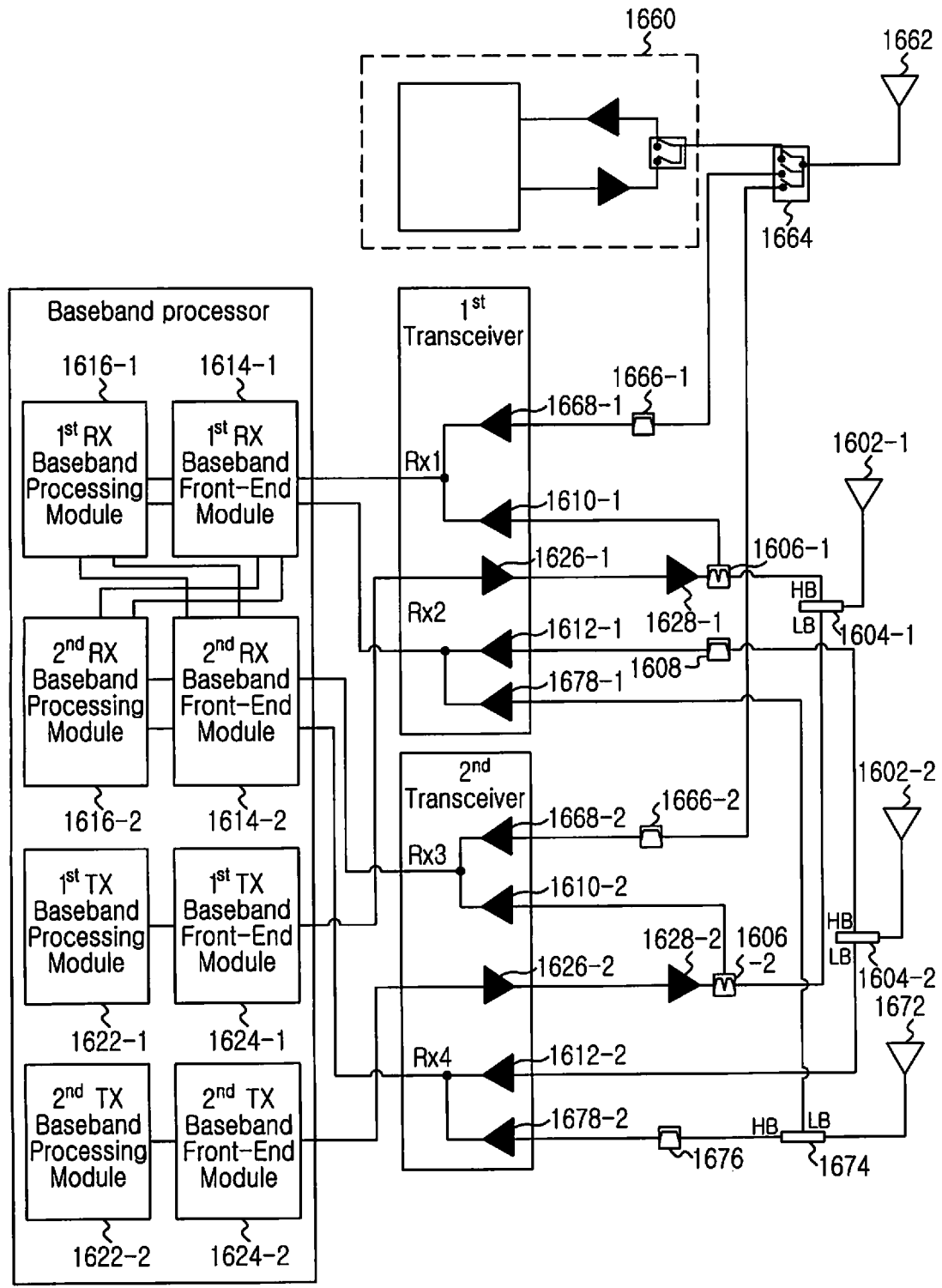
FIG. 16 illustrates an electronic device for a wireless communication according to an embodiment of the present disclosure.

FIG. 16 illustrates an electronic device for a wireless communication according to an embodiment of the present disclosure. In FIG. 16, an additional antenna may be utilized for a different communication other than a communication with a BS.

Referring to FIG. 16, the electronic device includes a first antenna 1602-1 and a second antenna 1602-2. The first antenna 1602-1 is connected to a first diplexer 1604-1. The first diplexer 1604-1 separates a TX signal into a first signal (e.g., a high-band signal) and a second signal (e.g., a low-band signal), and outputs the first signal towards a first transceiver and the second signal towards a second transceiver. The second antenna 1602-2 is connected to a second diplexer 1604-2. The second diplexer 1604-2 separates a TX signal into a first signal and a second signal, and outputs the first signal towards the first transceiver and the second signal towards the second transceiver.

The first transceiver and the second transceiver convert a provided RF signal to a baseband signal. Although only amplifiers of the first transceiver and the second transceiver are shown in FIG. 16, the first transceiver and the second transceiver may further include a filter, an oscillator, a mixer, an ADC, and the like.

The first signal output from the first diplexer 1604-1 is provided to an amplifier 1610-1 in the first transceiver via a first duplexer 1606-1. The first duplexer 1606-1 allows bidirectional communication over a single path for a TX signal and an RX signal, provides a signal received via the first antenna 1602-1 to the amplifier 1610-1, and provides a TX signal provided from the first transceiver to the first antenna 1602-1. A signal amplified by the amplifier 1610-1 is provided to a first RX baseband front-end module 1614-1 in a baseband processor. The first signal output from the second diplexer 1604-2 is provided to an amplifier 1612-1 of the first transceiver via a band-pass filter 1608. A signal amplified by the amplifier 1612-1 is provided to the first RX baseband front-end module 1614-1 in the baseband processor. Thereafter, the first RX baseband front-end module 1614-1 provides a signal to a first RX baseband processing module 1616-1. The first RX baseband front-end module 1614-1 and the first RX baseband processing module 1616-1 may be separate modules in a modem chip or integrated circuit, or may be one integrated module.

The second signal output from the first diplexer 1604-1 is provided to an amplifier 1610-2 in the second transceiver via a second duplexer 1606-2. A signal amplified by the amplifier 1610-2 is provided to a second RX baseband front-end module 1614-2 in the baseband processor. The second signal output from the second diplexer 1604-2 is provided to an amplifier 1612-2 of the second transceiver. A signal amplified by the amplifier 1612-2 is provided to the second RX baseband front-end module 1614-2 in the baseband processor. Thereafter, the second RX baseband front-end module 1614-2 provides a signal to a second RX baseband processing module 1616-2. The second RX baseband front-end module 1614-2 and the second RX baseband processing module 1616-2 may be separate modules in a modem chip or integrated circuit, or may be one integrated module.

The baseband processor includes a first TX baseband processing module 1622-1 and a first TX baseband front-end module 1624-1 to process a TX signal of the high band, and includes a second TX baseband processing module 1622-2 and a second TX baseband front-end module 1624-2 to process a signal of the low band. The first TX baseband processing module 1622-1 provides a baseband signal to be transmitted through the high band to the first TX baseband front-end module 1624-1. The first TX baseband processing module 1622-1 and the first TX baseband front-end module 1624-1 may be separate modules in a modem chip or integrated circuit, or may be one integrated module. The first TX baseband front-end module 1624-1 provides a TX signal to an amplifier 1626-1 in the first transceiver. A signal amplified in the amplifier 1626-1 is transmitted through the first antenna 1602-1 via an amplifier 1628-1, the first duplexer 1606-1, and the first diplexer 1604-1. The second TX baseband processing module 1622-2 provides the second TX baseband front-end module 1624-2 with a baseband signal to be transmitted through the low band. The second TX baseband processing module 1622-2 and the second TX baseband front-end module 1624-2 may be separate modules in a modem chip or integrated circuit, or may be one integrated module. The second TX baseband front-end module 1624-2 provides a TX signal to an amplifier 1626-2 in the second transceiver. A signal amplified in the amplifier 1626-2 is transmitted through the first antenna 1602-1 via an amplifier 1628-2, the second duplexer 1606-2, and the first diplexer 1604-1. In FIG. 16, the TX signal provided to the first transceiver is amplified by the two amplifiers 1626-1 and 1628-1, and the two amplifiers 1626-1 and 1628-1 may amplify signals of different bands. For example, the amplifier 1626-1 of a first stage may amplify an intermediary band of the TX signal, and the amplifier 1628-1 of a next stage may amplify a low band of the TX signal.

An additional antenna 1662 may be connected with the first transceiver, the second transceiver, or a different communication means 1660 through a switch 1664. For example, the different communication unit 1660 may include one of a Bluetooth module, a Wi-Fi module, a GPS module, a DMB module, and an NFC module. Although one different communication unit 1660 is illustrated in FIG. 16, a plurality of other communication units maybe included, and thus a plurality of additional antennas maybe included. Although not shown in FIG. 16, the different communication units 1660 may include a third transceiver.

A third antenna 1672 is connected with a diplexer 1674. The diplexer 1674 outputs the first signal (e.g., a high-band signal) received through the third antenna 1672 towards the second transceiver, and outputs the second signal (e.g., a low-band signal) towards the first transceiver. The second signal output from the diplexer 1674 is amplified by an amplifier 1678-1 in the first transceiver, and thereafter is provided to the first RX baseband front-end module 1614-1. The first signal output from the diplexer 1674 is amplified by an amplifier 1678-2 in the second transceiver via a band-pass filter 1676, and thereafter is provided to the second RX baseband front-end module 1614-2. Alternatively, according to the present disclosure, the band-pass filter 1676 may be omitted. In this case, the first signal output from the diplexer 1674 may be amplified by the amplifier 1678-2 in the second transceiver, and thereafter may be provided to the second RX baseband front-end module 1614-2.

In FIG. 16, the baseband processor include the first RX baseband processing module 1616-1, the second RX baseband processing module 1616-2, the first TX baseband processing module 1622-1, and the second TX baseband processing module 1622-2. In this case, the first RX baseband processing module 1616-1, the second RX baseband processing module 1616-2, the first TX baseband processing module 1622-1, and the second TX baseband processing module 1622-2 may be included in at least one modem chip or integrated circuit. For example, the first RX baseband processing module 1616-1, the second RX baseband processing module 1616-2, the first TX baseband processing module 1622-1, and the second TX baseband processing module 1622-2 may be included in one modem chip, or may be separately included in a plurality of modem chips.

If diversity reception is performed using an unused RX module according to the present disclosure, the additional antenna 1662 is used as an additional reception path. For this, the additional antenna 1662 is connected to the first transceiver or the second transceiver via an antenna switch 1664.

For example, if the second transceiver is currently processing the second signal, the antenna switch 1664 is used to receive the second signal through the additional antenna 1662 and to output it to the first transceiver. A signal output from the antenna switch 1664 is provided to the first transceiver via a first band-pass filter 1666-1, which passes a signal of a frequency in the low band, is amplified by an amplifier 1668-1 in the first transceiver, and thereafter is provided to the first RX baseband front-end module 1614-1. The first RX baseband front-end module 1614-1 provides the second signal to the second RX baseband processing module 1616-2. Accordingly, the electronic device further ensures one path for diversity reception. Further, the diplexer 1674 outputs the second signal received via the third antenna 1672 to the first transceiver. The second signal output from the diplexer 1674 is provided to the first transceiver, is amplified by the amplifier 1678-1 in the first transceiver, and thereafter is provided to the first RX baseband front-end module 1614-1. The first RX baseband front-end module 1614-1 provides the second signal to the second RX baseband processing module 1616-2. Accordingly, the electronic device further ensures another path for diversity reception. In addition, the second transceiver provides at least one second signal received through at least one of the first antenna 1602-1 and the second antenna 1602-2 to the second RX baseband front-end module 1614-2, and the second RX baseband front-end module 1614-2 provides the at least one second signal to the second RX baseband processing module 1616-2. As a result, the second RX baseband processing module 1616-2 combines the second signal received via at least one of the first antenna 1602-1, the second antenna 1602-2, and the third antenna 1672.

In addition, if the first transceiver is currently processing the first signal, the antenna switch 1664 is used to receive the first signal through the additional antenna 1662 and to output it to the second transceiver. In this case, a signal output from the antenna switch 1664 is provided to the second transceiver via a second band-pass filter 1666-2, which passes a signal of a frequency in the high band, is amplified by an amplifier 1668-2 in the second transceiver, and thereafter is provided to the second RX baseband front-end module 1614-2. The second RX baseband front-end module 1614-2 provides the first signal to the first RX baseband processing module 1616-1. Accordingly, the electronic device further ensures one path for diversity reception. Further, the diplexer 1674 outputs the first signal received via the third antenna 1672 to the second transceiver. The first signal output from the diplexer 1674 is provided to the second transceiver via the band-pass filter 1676, is amplified by an amplifier 1678-2 in the second transceiver, and thereafter is provided to the second RX baseband front-end module 1614-2. The second RX baseband front-end module 1614-2 provides the first signal to the first RX baseband processing module 1616-1. Accordingly, the electronic device further ensures another path for diversity reception. In addition, the first transceiver provides at least one first signal received through at least one of the first antenna 1602-1 and the second antenna 1602-2 to the first RX baseband front-end module 1614-1, and the first RX baseband front-end module 1614-1 provides the at least one first signal to the first RX baseband processing module 1616-1. As a result, the first RX baseband processing module 1616-1 combines the first signal received via at least one of the first antenna 1602-1, the second antenna 1602-2, and the third antenna 1672.

Figure 17:
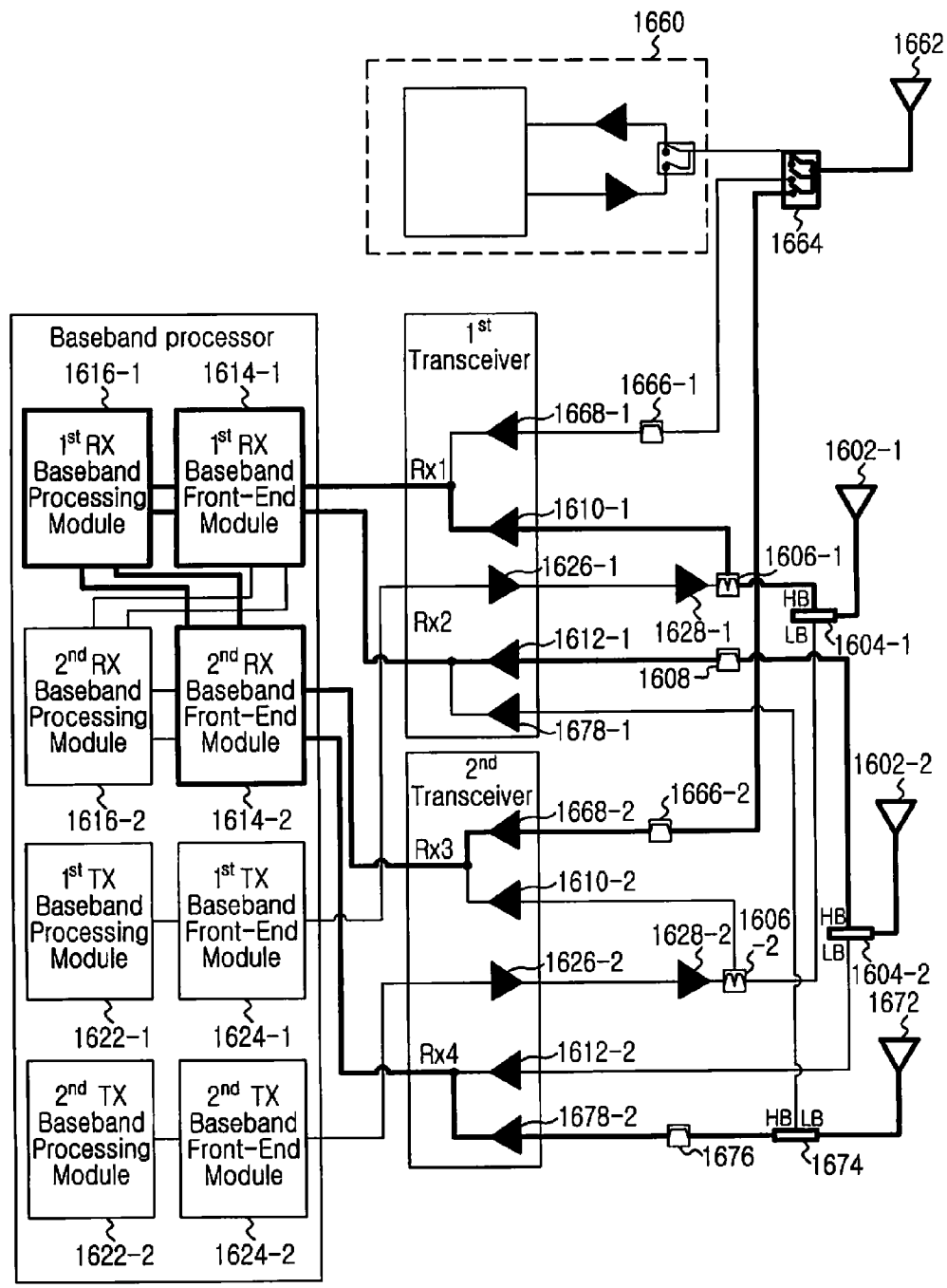
FIG. 17 illustrates a signal processing path of an electronic device according to an embodiment of the present disclosure.

According to FIG. 16, for additional diversity reception concerning the first signal, signal processing is performed as shown in FIG. 17. FIG. 17 illustrates a signal processing path of an electronic device according to an embodiment of the present disclosure. In FIG. 17, a signal processing path and activated blocks are indicated by a bold line.

Referring to FIG. 17, if the first signal (e.g., a high-band signal) is received, the first transceiver for the first signal, the first RX baseband front-end module 1614-1 in the baseband processor, and the first RX baseband processing module 1616-1 processes the first signal. In addition, the second transceiver for the second signal, the second RX baseband front-end module 1614-2 in the baseband processor, and the second RX baseband processing module 1616-2 may not be provided with the second signal. Instead, according to the present disclosure, the second transceiver and second RX baseband front-end module 1614-2 in the baseband processor receive the first signal through the additional antenna 1662 and the third antenna 1672. For example, the second transceiver and the second RX baseband front-end module 1614-2 receive the first signal through the additional antenna 1662 and the third antenna 1672 and provide the signals to the first RX baseband processing module 1616-1.

As described above, a plurality of first signals are provided to the first RX baseband processing module 1616-1. The plurality of first signals to be provided to the first RX baseband processing module 1616-1 is input to the baseband processor. In this case, an input for the first signal and an input for the second signal are used, and the first signals are collected at the first RX baseband processing module 1616-1 through routing in the baseband processor. The input is a medium for delivering a signal from an external element of the baseband processor to an internal element of the baseband processor, and connects the baseband processor to a path for delivering a signal to the baseband processor. The input may be referred to as a pin or a node, and is constructed of an electrically conductive material.

Accordingly, the first RX baseband processing module 1616-1 acquires a diversity reception gain by combining four first signals received through the first RX baseband processing module 1616-1, the first antenna 1602-1, a second antenna 1602-2, the additional antenna 1662, and the third antenna 1672. According to the present disclosure, the first RX baseband processing module 1616-1 combines the four RX signals or may selectively combine only some signals, that is, may use a diversity reception scheme such as MRC, in-phase combination, constant gain combination, simple selection or antenna selection switching, and the like. In addition to these schemes, other diversity reception schemes may also be applied. For example, the first RX baseband processing module 1616-1 may combine only two or three signals having excellent signal quality. Herein, the signal quality may be determined on the basis of at least one of RX signal strength, SNR, SINR, antenna correlation, RX signal strength, RX signal's arrival delay time, and the like.

Unlike a signal processing path illustrated in FIG. 17, the first signal received via the third antenna 1672 may be provided to the first transceiver along a path connected to the first transceiver. In this case, a collision may occur with a signal received via the second antenna 1602-2. However, by turning off the amplifier 1678-1 on a path on which the first signal received via the third antenna 1672 is delivered, the electronic device may avoid a transmission of the first signal received via the third antenna 1672 in the first transceiver. Herein, turning off the amplifier 1678-1 may include one of blocking power supplied to the amplifier 1678-1 and applying an inactive signal to an enable node of the amplifier 1678-1.

According to another embodiment of the present disclosure, unlike the turning off the amplifier 1678-1, a switch may be included between the amplifier 1678-1 and the diplexer 1674, or the diplexer 1674 may be replaced with a switch similar to the antenna switch 1664.

As described above, according to an embodiment of the present disclosure, the electronic device may include a first transceiver for processing a first carrier, a second transceiver for processing a second carrier, a switch, a baseband processor for processing a first baseband signal and a second baseband signal, which are processed respectively by the first transceiver and the second transceiver, an antenna connected through the switch in association with some of a plurality of reception paths with respect to the first carrier, and a reception path for providing the second transceiver with the first carrier received via the antenna connected through the switch to the second transceiver.

According to an embodiment of the present disclosure, the electronic device may include a first transceiver for processing an RX signal of a first carrier when operating in a CA mode, a second transceiver for processing an RX signal of a second carrier when operating in the CA mode, and a baseband processor for demodulating and decoding a signal processed by the first transceiver and the second transceiver. The second transceiver may convert an RX signal of the first carrier to a baseband signal when operating in a non-CA mode. The baseband processor may be provided with a baseband signal of the first carrier from the first transceiver via an input means corresponding to the first transceiver and may be provided with a baseband signal of the first carrier from the second transceiver via an input means corresponding to the second transceiver, and thereafter may provide the baseband signals to one processing module through internal routing to combine the baseband signals.

According to an embodiment of the present disclosure, the electronic device may include a first antenna, a second antenna, and a third antenna, and first and second transceivers for receiving at least one of a first signal and a second signal via the first antenna, the second antenna, and the third antenna. If the first signal is not received, the first transceiver may receive the second signal via the first antenna and the second antenna, and the second transceiver may be configured to receive the second signal via the third antenna.

Figure 18:
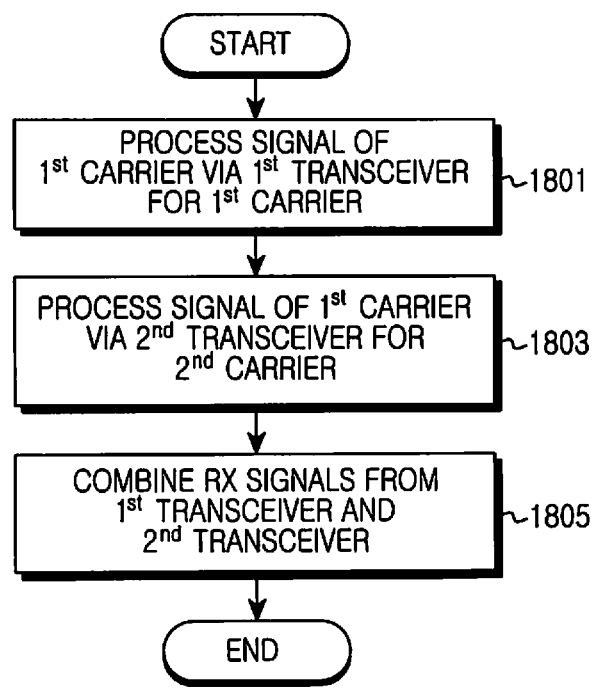
FIG. 18 is a flowchart illustrating an operation of an electronic device for a wireless communication according to an embodiment of the present disclosure.

FIG. 18 is a flowchart illustrating an operation of an electronic device for a wireless communication according to an embodiment of the present disclosure.

Referring to FIG. 18, in step 1801, the electronic device (e.g., the electronic device of FIG. 1) processes a signal of a first carrier via a first transceiver for the first carrier. For example, the electronic device may perform a process of filtering, amplifying, down-converting to a baseband signal, quantizing, and the like, on the signal of the first carrier. The signal of the first carrier may be a signal transmitted from a TX side (e.g., a BS) via the first carrier. The electronic device may be in a state of being scheduled for the first carrier. In this case, a plurality of signals received respectively via a plurality of antennas may be processed in the first transceiver.

In step 1803, the electronic device (e.g., the electronic device of FIG. 1) processes the signal of the first carrier via a second transceiver for a second carrier. For example, the electronic device may perform a process of filtering, amplifying, down-converting to a baseband signal, quantizing, and the like, on the signal of the first carrier. In this case, the electronic device is in a state of not being scheduled for the second carrier. For example, the TX side (e.g., the BS) may not support the second carrier, or the electronic device may operate in a single-carrier mode, or a resource may not be allocated to the electronic device in a data channel of the second carrier, or the electronic device may belong to a non-reception duration in a discontinuous reception (DRX) mode in the second carrier.

In step 1805, the electronic device (e.g., the electronic device of FIG. 1) combines an RX signal processed in the first transceiver and an RX signal processed in the second transceiver. If a plurality of signals received respectively via a plurality of antennas is processed in the first transceiver, the electronic device combines three or more RX signals such as signals processed in the first transceiver and RX signals processed in the second transceiver. According to another embodiment of the present disclosure, the electronic device selectively combines some of the three or more RX signals provided from the first transceiver and the second transceiver.

In the embodiment of FIG. 18, the steps 1801, 1803, and 1805 are performed sequentially. However, the present disclosure is not limited to the order illustrated in FIG. 18. Therefore, according to another embodiment of the present disclosure, the steps 1801, 1803, and 1805 may be performed in different orders or may be performed concurrently. It is apparent that all of the steps 1801, 1803, and 1805 may be performed concurrently, or only some of them may be performed concurrently.

Figure 19:
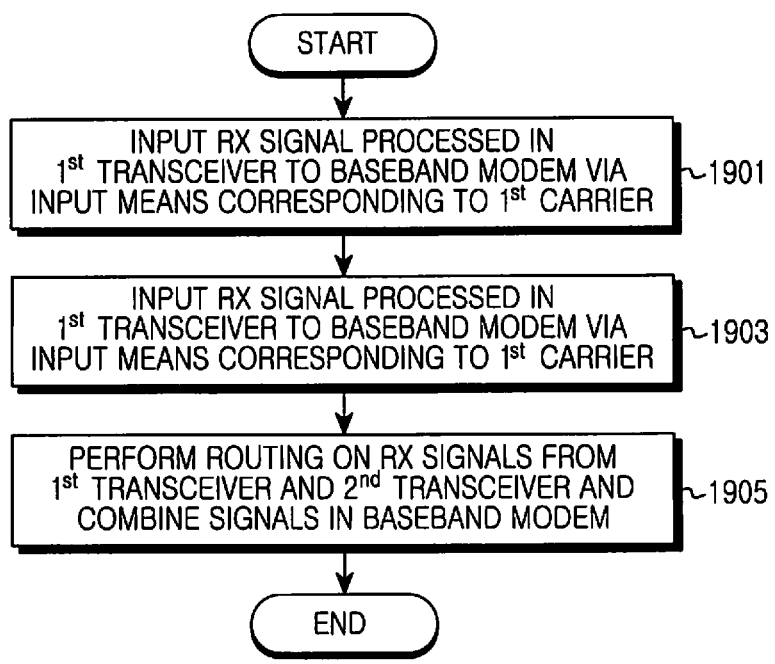
FIG. 19 is a flowchart illustrating an operation of an electronic device for a wireless communication according to an embodiment of the present disclosure.

FIG. 19 is a flowchart illustrating an operation of an electronic device for a wireless communication according to an embodiment of the present disclosure.

Referring to FIG. 19, in step 1901, the electronic device (e.g., the electronic device of FIG. 1) inputs an RX signal processed in a first transceiver to a baseband modem via an input corresponding to a first carrier. The input is a medium for delivering a signal from an external element of the baseband processor to an internal element of the baseband processor, and connects the baseband processor to a path for delivering a signal to the baseband processor. The input may be referred to as a pin or a node, and is constructed of an electrically conductive material. The baseband modem has a plurality of inputs for receiving a signal input. The plurality of pins may be divided into inputs corresponding to a first carrier and a second carrier. Herein, a process in the first transceiver may include at least one of filtering, amplifying, down-converting to a baseband signal, quantizing, and the like.

In step 1903, the electronic device (e.g., the electronic device of FIG. 1) inputs an RX signal processed in a second transceiver to the baseband modem via an input corresponding to the second carrier. In this case, according to the present disclosure, an RX signal processed in the second transceiver includes the signal of the first carrier. The electronic device may be in a state of not being scheduled for the second carrier. For example, a TX side (e.g., a BS) may not support the second carrier, or the electronic device may operate in a single-carrier mode, or a resource may not be allocated to the electronic device in a data channel of the second carrier, or the electronic device may belong to a non-reception duration in a DRX mode in the second carrier.

In step 1905, the electronic device (e.g., the electronic device of FIG. 1) performs routing on RX signals, provided from the first transceiver and the second transceiver, in the baseband modem, and combines the RX signals. The RX signals processed respectively by the first transceiver and the second transceiver are input via inputs corresponding to the respective transceivers when the signals are input to the baseband modem, but are collected at one baseband signal processing module through internal routing in the baseband modem. Accordingly, the electronic device combines the RX signals. If a plurality of signals received respectively via a plurality of antennas is processed in the first transceiver, the electronic device combines three or more RX signals such as signals processed in the first transceiver and RX signals processed in the second transceiver. According to another embodiment of the present disclosure, the electronic device selectively combines some of the three or more RX signals provided from the first transceiver and the second transceiver.

In the embodiment of FIG. 19, steps 1901, 1903, and 1905 are performed sequentially. However, the present disclosure is not limited to the order illustrated in FIG. 19. Therefore, according to another embodiment of the present disclosure, steps 1901, 1903, and 1905 may be performed in different orders or may be performed concurrently. It is apparent that all of the steps 1901, 1903, and 1905 may be performed concurrently, or only some of them may be performed concurrently.

Figure 20:
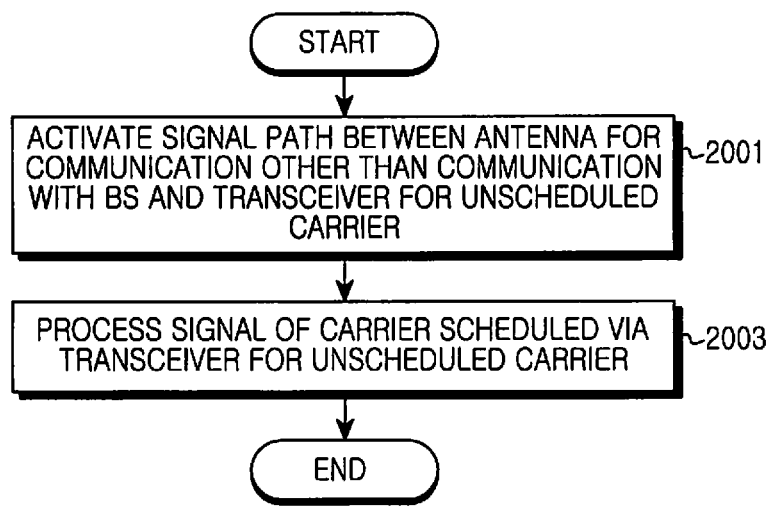
FIG. 20 is a flowchart illustrating an operation of an electronic device for a wireless communication according to an embodiment of the present disclosure.

FIG. 20 is a flowchart illustrating an operation of an electronic device for a wireless communication according to an embodiment of the present disclosure.

Referring to FIG. 20, in step 2001, the electronic device (e.g., the electronic device of FIG. 1) activates a signal path between an antenna for a different communication other than a communication with a BS and a transceiver for an unscheduled carrier. The electronic device has a communication unit for the different communication other than the communication with the BS and at least one antenna. For example, the communication unit may include a Bluetooth module, a Wi-Fi module, a GPS module, a DMB module, and an NFC module. In addition, the electronic device has a plurality of transceivers which correspond to respective carriers. In this case, the antenna for the different communication has a structure capable of connecting with the transceiver for the communication with the BS. For example, the antenna for the different communication and the transceiver for the communication with the BS may be connected via an antenna switch, a band-pass filter, and the like. In this case, the electronic device activates the signal path by controlling the antenna switch and the band-pass filter. Herein, the unscheduled case may include one of a case where a TX side (e.g., the BS) does not support the second carrier or the electronic device operates in a single-carrier mode, a case where a resource is not allocated to the electronic device in a data channel of the second carrier, and a case where the electronic device belongs to a non-reception duration in a DRX mode in the second carrier.

In step 2003, the electronic device (i.e., the electronic device of FIG. 1) processes a signal of a carrier scheduled via the transceiver for the unscheduled carrier. For example, the electronic device may perform a process of filtering, amplifying, down-converting to a baseband signal, quantizing, and the like, on the signal of the scheduled carrier.

In the embodiment of FIG. 20, steps 2001 and 2003 are performed sequentially. However, the present disclosure is not limited to the order illustrated in FIG. 20. Therefore, according to another embodiment of the present disclosure, the steps 2001 and 2003 may be performed in different orders or may be performed concurrently.

Although not shown in FIG. 20, the electronic device may combine an RX signal processed via the transceiver for the unscheduled carrier and at least one RX signal processed via the transceiver for the scheduled carrier. The electronic device may include the transceiver for the scheduled carrier, and can obtain a diversity reception gain by combining the RX signals.

According to another embodiment of the present disclosure, the electronic device includes a plurality of antennas for a different communication other than a communication with the BS. In this case, by activating one of the plurality of antennas, the electronic device provides an RX signal to the transceiver for the unscheduled carrier. Further, the electronic device changes the activated antenna according to whether a reception capability is improved, how much the reception capability is improved, and the like. For example, although diversity reception is performed by activating a signal path between the transceiver and one of the plurality of antennas for the different communications, if a reception capability improvement level is less than a threshold, the electronic device activates the signal path between the transceiver and another antenna among the plurality of antennas for the different communications.

Figure 21:
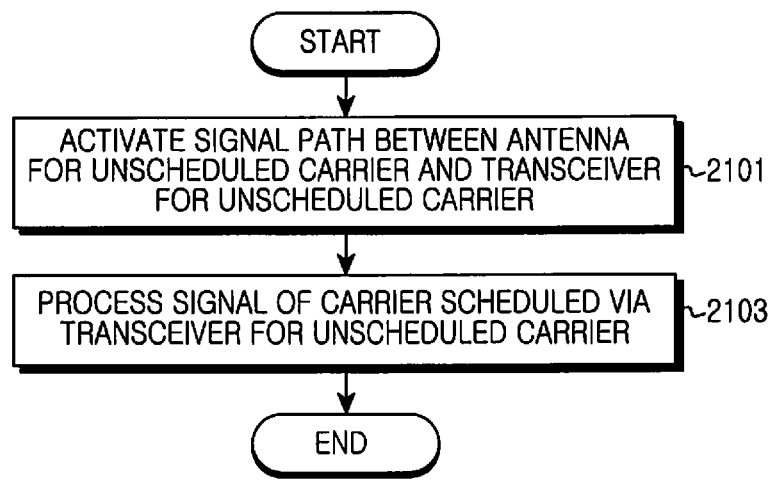
FIG. 21 is a flowchart illustrating an operation of an electronic device for a wireless communication according to an embodiment of the present disclosure.

FIG. 21 is a flowchart illustrating an operation of an electronic device for a wireless communication according to an embodiment of the present disclosure.

Referring to FIG. 21, in step 2101, the electronic device (e.g., the electronic device of FIG. 1) activates a signal path between an antenna for a different communication other than a communication with a BS and a transceiver for an unscheduled carrier. The electronic device has a plurality of transceivers which correspond to respective carriers. In this case, the electronic device controls the signal path to deliver not the unscheduled carrier but a signal of another scheduled carrier. For example, the electronic device activates a band-pass filter for passing a signal of a frequency of the different carrier on the signal path, and controls an antenna switch connected to an antenna for the unscheduled carrier so that a signal received via the antenna for the unscheduled carrier is delivered to the transceiver via the band-pass filter. Herein, the unscheduled case may include one of a case where a TX side (e.g., the BS) does not support the second carrier or the electronic device operates in a single-carrier mode, a case where a resource is not allocated to the electronic device in a data channel of the second carrier, and a case where the electronic device belongs to a non-reception duration in a DRX mode in the second carrier.

In step 2103, the electronic device (i.e., the electronic device of FIG. 1) processes a signal of a carrier scheduled via the transceiver for the unscheduled carrier. For example, the electronic device may perform a process of filtering, amplifying, down-converting to a baseband signal, quantizing, and the like, on the signal of the scheduled carrier.

In the embodiment of FIG. 21, steps 2101 and 2103 are performed sequentially. However, the present disclosure is not limited to the order illustrated in FIG. 21. Therefore, according to another embodiment of the present disclosure, steps 2101 and 2103 may be performed in different orders or may be performed concurrently.

Although not shown in FIG. 21, the electronic device may combine an RX signal processed via the transceiver for the unscheduled carrier and at least one RX signal processed via the transceiver for the scheduled carrier. The electronic device may include the transceiver for the scheduled carrier, and can obtain a diversity reception gain by combining the RX signals FIG. 22 is a flowchart illustrating an operation of an electronic device for a wireless communication according to an embodiment of the present disclosure.

Figure 22:
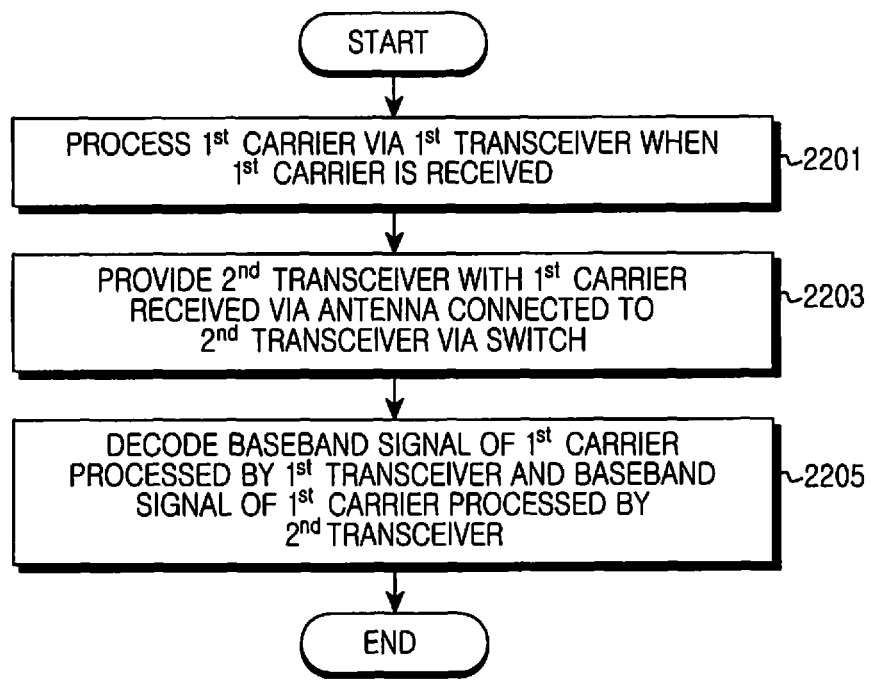
FIG. 22 is a flowchart illustrating an operation of an electronic device for a wireless communication according to an embodiment of the present disclosure.

Referring to FIG. 22, in step 2201, the electronic device (e.g., the electronic device of FIG. 1) processes a first carrier via a first transceiver when the first carrier is received. Herein, the first transceiver is a module for converting an RF signal to a baseband signal. For example, the first transceiver may include a filter, an amplifier, an oscillator, a mixer, an ADC, and the like.

In step 2203, the electronic device (e.g., the electronic device of FIG. 1) provides a second transceiver with the first carrier received via an antenna connected to the second transceiver through a switch. The second transceiver is a module for processing the second carrier when receiving the second carrier. However, in a case where the second carrier is not processed, if the electronic device does not receive the second carrier, the electronic device provides the second transceiver with the first carrier. Accordingly, the second transceiver may process the first carrier, instead of the second carrier.

In step 2205, the electronic device (e.g., the electronic device of FIG. 1) demodulates and decodes a baseband signal of the first carrier processed by the first transceiver and a baseband signal of the first carrier processed by the second transceiver. In this case, the electronic device combines the baseband signals processed respectively by the first transceiver and the second transceiver. The electronic device obtains a diversity reception gain by combining the baseband signals.

In the embodiment of FIG. 22, steps 2201, 2203, and 2205 are performed sequentially. However, the present disclosure is not limited to the order illustrated in FIG. 22. Therefore, according to another embodiment of the present disclosure, steps 2201, 2203, and 2205 may be performed in different orders or may be performed concurrently. It is apparent that all of the steps 2201, 2203, and 2205 may be performed concurrently, or only some of them may be performed concurrently.

Figure 23:
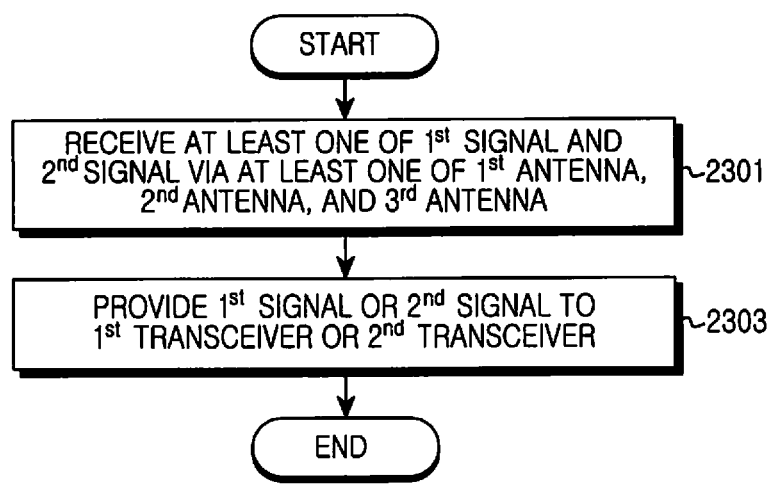
FIG. 23 is a flowchart illustrating an operation of an electronic device for a wireless communication according to an embodiment of the present disclosure.

FIG. 23 is a flowchart illustrating an operation of an electronic device for a wireless communication according to an embodiment of the present disclosure.

Referring to FIG. 23, in step 2301, the electronic device (e.g., the electronic device of FIG. 1) receives at least one of a first signal and a second signal via at least one of a first antenna, a second antenna, and a third antenna. Herein, some of the first antenna, the second antenna, and the third antenna are provided for a communication with a BS, and the remaining antennas may be provided for different communications. In another example, the first antenna, the second antenna, and the third antenna may be provided for the communication with the BS.

In step 2303, the electronic device (e.g., the electronic device of FIG. 1) provides the first signal or the second signal to a first transceiver or a second transceiver. In this case, if the second signal is not received, the electronic device provides the first transceiver with the first signal received via the first antenna and the second antenna, and provides the second transceiver with the first signal received via the third antenna. Otherwise, if the first signal is not received, the electronic device provides the second transceiver with the second signal received via the first antenna and the second antenna, and provides the first transceiver with the second signal received via the third antenna.

In the embodiment of FIG. 23, steps 2301 and 2303 are performed sequentially. However, the present disclosure is not limited to the order illustrated in FIG. 23. Therefore, according to another embodiment of the present disclosure, the steps 2301 and 2303 may be performed in different orders or may be performed concurrently.

Although not shown in FIG. 23, the first transceiver and the second transceiver may respectively change the provided signals to baseband signals. Thereafter, the baseband signals converted respectively by the first transceiver and the second transceiver are provided to a baseband processor (e.g., a modem chip or integrated circuit), and the baseband processor combines the baseband signals. In this case, the baseband signal converted by the first transceiver is provided via an input corresponding to the first transceiver, and the baseband signal converted by the second transceiver is provided to the baseband processor via an input corresponding to the second transceiver. Thereafter, the baseband signals are collected at one processing module through internal routing in the baseband processor.

Figure 24:
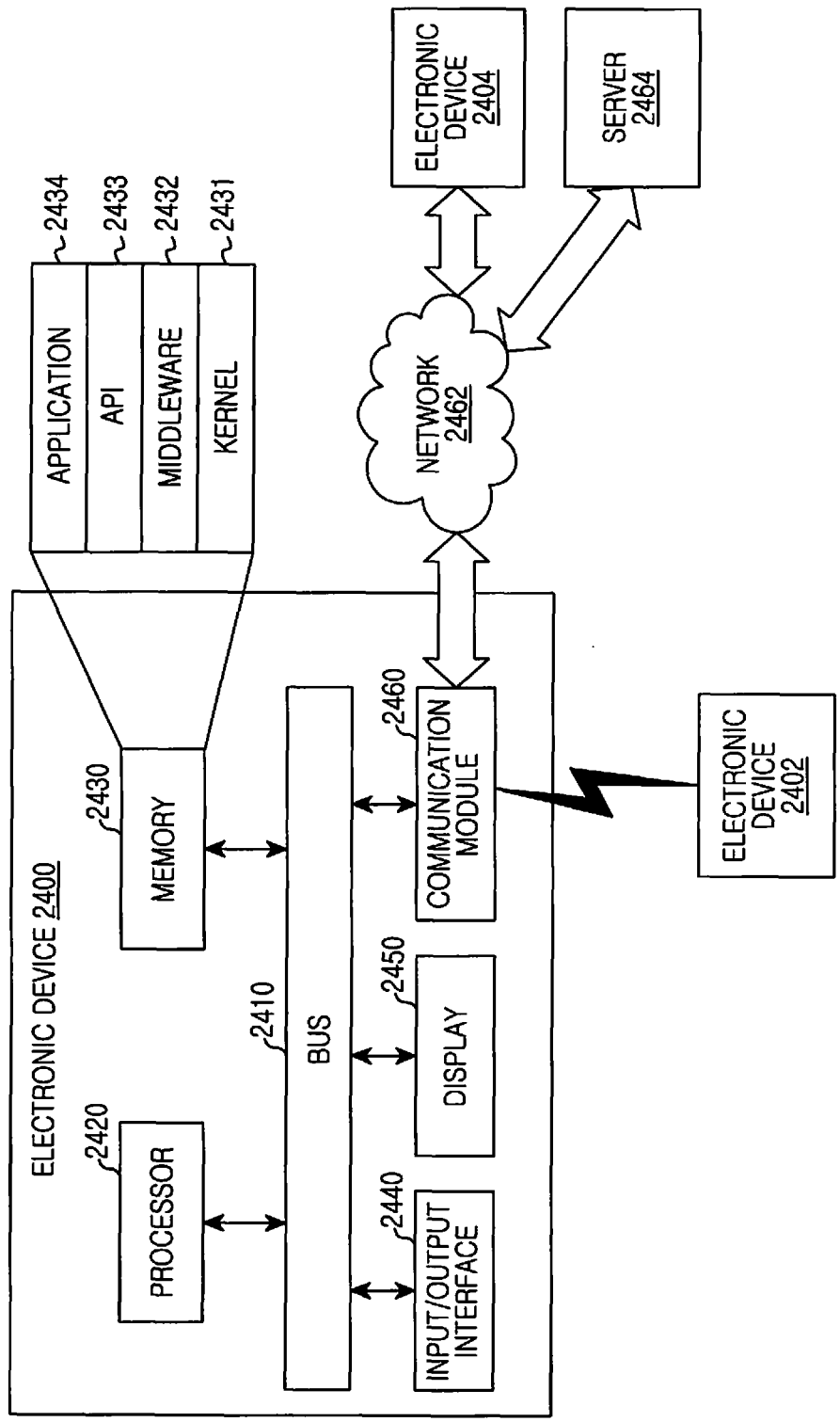
FIG. 24 illustrates a block diagram of an electronic device according to the present disclosure.

FIG. 24 illustrates a block diagram of an electronic device according to various embodiments of the present disclosure.

Referring to FIG. 24, an electronic device 2400 includes a bus 2410, a processor 2420, a memory 2430, an input/output interface 2440, a display 2450, and a communication module 2460.

The bus 2410 is a circuit for connecting the aforementioned elements and for delivering a communication (e.g., a control message) between the aforementioned elements.

For example, the processor 2420 receives an instruction from other elements (e.g., the memory 2430, the input/output interface 2440, the display 2450, the communication module 2460, and the like), and thus may interpret the received instruction and execute arithmetic or data processing according to the interpreted instruction.

The memory 2430 stores an instruction or data received from the processor 2420 or other elements (e.g., the input/output interface 2440, the display 2450, the communication module 2460, and the like) or generated by the processor 2420 or other elements. The memory 2430 may include programming modules such as a kernel 2431, a middleware 2432, an Application Programming Interface (API) 2433, an application 2434, and the like. Each of the aforementioned programming modules may consist of software, firmware, or hardware entities or may consist of at least two or more combinations thereof.

The kernel 2431 controls or manages the remaining other programming modules, for example, system resources (e.g., the bus 2410, the processor 2420, the memory 2430, and the like) used to execute an operation or function implemented in the middleware 2432, the API 2433, or the application 2434. In addition, the kernel 2431 provides a controllable or manageable interface by accessing individual elements of the electronic device 2400 in the middleware 2432, the API 2433, or the application 2434.

The middleware 2432 performs an intermediary role so that the API 2433 or the application 2434 communicates with the kernel 2431 to exchange data. In addition, regarding task requests received from the (plurality of) applications 2434, the middleware 2432 performs load balancing for the task request by using a method of assigning a priority or the like capable of using a system resource (e.g., the bus 2410, the processor 2420, the memory 2430, and the like) of the electronic device 2400 to at least one application among the (plurality of) applications 2434.

The API 2433 includes at least one interface or function for file control, window control, video processing, or character control, and the like, as an interface capable of controlling a function provided by the application 2434 in the kernel 2431 or the middleware 2432.

The input/output interface 2440 receives an instruction or data from a user and delivers it to the processor 2420 or the memory 2430 via the bus 2410. The display 2450 displays video, image, data, and the like, to the user.

The communication module 2460 connects a communication between another electronic device 2402 and the electronic device 2400. The communication module 2460 may support a specific near-field communication protocol (e.g., Wi-Fi, Bluetooth, NFC) or a specific communication network 2462 (e.g., Internet, Local Area Network (LAN), Wide Area Network (WAN), telecommunication network, cellular network, satellite network, Plain Old Telephone Service (POTS), and the like). Each of the electronic devices 2402 and 2204 may be a device which is the same (e.g., the same type) as the electronic device 2400 or may be a different (e.g., a different type) device.

The communication module 2460 may be used to perform a communication with a BS. For example, for the communication with the BS, the communication module 2460 may include at least one transceiver and at least one baseband processor. The baseband processor may include at least one baseband module. For example, the communication module 2460 may include at least one of the antenna connector 110, first RF processing module 120-1, second RF processing module 120-2, first baseband processing module 130-1, and second baseband processing module 130-2 of FIG. 1. According to various embodiments of the present disclosure, an electronic device for performing the communication with the BS includes the electronic devices of FIG. 5, FIG. 8, FIG. 10, FIG. 12, FIG. 13, FIG. 15, and FIG. 16.

An electronic device additionally utilizes RX modules to additionally ensure a signal reception path and diversity reception is performed on a plurality of signals, thereby being able to improve reception.

In the aforementioned embodiments of the present disclosure, an element included in the disclosure is expressed in a singular or plural form according to the embodiments herein. However, the singular or plural expression is selected properly for a situation for the convenience of explanation, and thus the disclosure is not limited to a single or a plurality of elements. Therefore, an element expressed in a plural form may also be expressed in a singular form, or vice versa. While the present disclosure is defined in the appended claims and their equivalents.

What is claimed is:

1. An electronic device comprising:
a plurality of antennas;

a first transceiver configured to connect to each of the plurality of antennas;

a second transceiver configured to connect to each of the plurality of antennas; and a baseband processor configured to process baseband signals, which are processed respectively by the first transceiver and the second transceiver, in one of a carrier aggregation (CA) mode and a non-CA mode, wherein the baseband processor comprises a first baseband processing module and a second baseband processing module, wherein when operating in the CA mode:
  a first carrier and a second carrier is received through the plurality of antennas,
  the first transceiver processes the first carrier, and sends the processed first carrier to the first baseband processing module,
  the first baseband processing module processes a first baseband signal which is processed by the first transceiver,
  the second transceiver processes the second carrier, and sends the processed second carrier to the second baseband processing module,
  the second baseband processing module processes a second baseband signal which is processed by the second transceiver, and
  the baseband processor aggregates the first baseband signal and the second baseband signal, and wherein when operating in the non-CA mode:
  the first carrier is received through the plurality of antennas,
  the first transceiver and the second transceiver process the received first carrier, respectively,
  the second baseband processing module sends a third baseband signal which is processed by the second transceiver to the first baseband processing module, and
  the first baseband processing module combines a fourth baseband signal which is processed by the first transceiver and the third baseband signal.

2. The electronic device of claim 1, wherein the second baseband processing module sends the third baseband signal to the first baseband processing module through internal routing.

3. The electronic device of claim 1,
wherein when operating in the non-CA mode:
the second carrier is received through the plurality of antennas;
the first transceiver and the second transceiver process the received second carrier, respectively;
the first baseband processing module sends a fifth baseband signal which is processed by the first transceiver to the second baseband processing module; and
the second baseband processing module combines a sixth baseband signal which is processed by the second transceiver and the fifth baseband signal.

4. The electronic device of claim 1, further comprising a switch configured to connect the plurality of antennas to the first transceiver and the second transceiver and to provide a plurality of reception paths from the plurality of antennas to the first transceiver and the second transceiver.

5. The electronic device of claim 4, wherein when operating in the non-CA mode, the plurality of reception paths comprises a reception path configured to provide the second transceiver with the first carrier received via the plurality of antennas through the switch, and wherein the reception path includes a band-pass filter configured to filter a frequency band of the first carrier.

6. The electronic device of claim 1, wherein when operating in the non-CA mode, the first baseband processing module selects some signals to be combined on the basis of signal quality from at least one first baseband signal processed by the first transceiver and a signal of the first carrier processed by the second transceiver.

7. The electronic device of claim 1, further comprising a controller configured to select, when operating in the non-CA mode, an antenna configured to receive a signal of the first carrier to be provided to the second transceiver of the plurality of antennas.

8. The electronic device of claim 7, wherein when operating in the non-CA mode, the controller changes the antenna configured to receive the signal of the first carrier according to whether a reception capability is improved.

9. A method of controlling an electronic device, the method comprising:
receiving at least one carrier through a plurality of antennas;
processing the carrier by a first transceiver and a second transceiver; and
processing baseband signals of the carrier, which are processed by the first transceiver and the second transceiver, in one of a carrier aggregation (CA) mode and a non-CA mode;
wherein the processing of the carrier comprises:
when operating in the CA mode receiving a first carrier and a second carrier through the plurality of antennas, processing the first carrier to a first baseband signal by the first transceiver, processing the second carrier to a second baseband signal by the second transceiver, aggregating the first baseband signal and the second baseband signal, and
when operating in the non-CA mode receiving a first carrier through the plurality of antennas, processing the first carrier to a third baseband signal by the first transceiver, processing the first carrier to a fourth baseband signal by the second transceiver, and combining, by a baseband processor, the third baseband signal and the fourth baseband signal.

10. The method of claim 9, wherein the baseband processor comprises a first baseband processing module and a second processing module, and
wherein the combining the third baseband signal and the fourth baseband signals comprises:
the second baseband processing module sending the third baseband signal to the first baseband processing module through internal routing, and combining, by the first baseband processing module, the third baseband signal and the fourth baseband signal.

11. The method of claim 9, further comprising:
when operating in the non-CA mode receiving the second carrier through the plurality of antennas;
processing, by the first transceiver and the second transceiver, the received second carrier to a fifth baseband signal and a sixth baseband signal, respectively; and
combining the fifth baseband signal and the sixth baseband signal.

12. The method of claim 9, wherein the electronic device comprises a switch configured to connect the plurality of antennas to the first transceiver and the second transceiver and to provide a plurality of reception paths from the plurality of antennas to the first transceiver and the second transceiver, and wherein the plurality of reception paths comprises a reception path configured to provide the second transceiver with the first carrier received via the plurality of antennas through the switch.

13. The method of claim 9, wherein when operating in the non-CA mode, the reception path includes a band-pass filter configured to filter a frequency band of the first carrier.

14. The method of claim 9, further comprising when operating in the non-CA mode changing an antenna configured to receive a signal of the first carrier according to whether a reception capability is improved.

* * * * *